(12) United States Patent
Alsadah

(10) Patent No.: US 11,707,695 B1
(45) Date of Patent: Jul. 25, 2023

(54) MULTIPLE-EFFECT SYSTEM AND METHOD FOR DESALINATION AND COOLING

(71) Applicant: KING FAHD UNIVERSITY OF PETROLEUM AND MINERALS, Dhahran (SA)

(72) Inventor: Jihad Hassan Alsadah, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/849,878

(22) Filed: Jun. 27, 2022

(51) Int. Cl.
*B01D 1/26* (2006.01)
*B01D 1/28* (2006.01)
(Continued)

(52) U.S. Cl.
CPC .............. *B01D 1/26* (2013.01); *B01D 1/28* (2013.01); *B01D 5/006* (2013.01); *B01D 5/0036* (2013.01);
(Continued)

(58) Field of Classification Search
CPC .. B01D 1/221; B01D 1/26; B01D 1/28–2896; B01D 3/065; B01D 3/146; C02F 1/041
See application file for complete search history.

(56) References Cited

U.S. PATENT DOCUMENTS 2,073,738 A * 3/1937 Faber ........................ B01D 1/28
159/17.4

3,499,827 A * 3/1970 Cox .......................... B01D 1/26
159/13.1
(Continued)

FOREIGN PATENT DOCUMENTS

CN    110467233 A    11/2019
CN    211644660 U    10/2020

OTHER PUBLICATIONS

Khalid, et al. ; Allocation of thermal vapor compressor in multi effect desalination systems with different feed configurations ; Desalination, vol. 426 ; pp. 164-173 ; Jan. 15, 2018 ; Abstract Only ; 3 Pages.
(Continued)

*Primary Examiner* — Jonathan Luke Pilcher
(74) *Attorney, Agent, or Firm* — Oblon, McClelland, Maier & Neustadt, L.L.P.

(57) ABSTRACT

A multi-effect system and a multi-effect method for desalination are provided. The method comprises flowing saline water over a thermally conductive plate of a first evaporation chamber; heating the thermally conductive plate to evaporate the saline water, resulting in vapor; removing the vapor from the first evaporation chamber; compressing, using a compressor, the vapor, thereby creating compressed vapor; pumping the compressed vapor into a first condensation chamber; condensing the compressed vapor in the first condensation chamber, resulting in fresh water. The method further comprises heating, by heat released by the condensing of the compressed vapor, a second thermally conductive plate forming a top of the first condensation chamber and a bottom surface of a next evaporation chamber in a next desalination chamber in the vertical stack of desalination chambers.

18 Claims, 18 Drawing Sheets

(51) Int. Cl.
    *C02F 1/04*     (2023.01)
    *B01D 5/00*     (2006.01)
    *C02F 103/08*     (2006.01)

(52) U.S. Cl.
    CPC ............ *B01D 5/0039* (2013.01); *C02F 1/041* (2013.01); *C02F 1/048* (2013.01); *C02F 2103/08* (2013.01)

(56) References Cited

U.S. PATENT DOCUMENTS

| | | | |
|---|---|---|---|
| 3,788,954 A * | 1/1974 | Cantrell | B01D 1/22 |
| | | | 203/81 |
| 4,668,345 A | 5/1987 | Warren | |
| 9,539,522 B1 | 1/2017 | El-Sayed | |
| 2008/0083605 A1* | 4/2008 | Holtzapple | B01D 1/28 |
| | | | 239/398 |
| 2012/0199534 A1* | 8/2012 | Holtzapple | C02F 1/42 |
| | | | 210/664 |
| 2019/0301808 A1* | 10/2019 | Holtzapple | B01D 1/305 |
| 2021/0178281 A1 | 6/2021 | Alsaadi et al. | |

OTHER PUBLICATIONS

Yang, et al. ; Wastewater desalination system utilizing a low temperature heat pump ; International Journal of Energy Research ; Oct. 5, 2017 ; Abstract Only ; 3 Pages.

\* cited by examiner

MULTIPLE-EFFECT SYSTEM AND METHOD FOR DESALINATION AND COOLING

BACKGROUND

Technical Field

The present disclosure relates, in general, to a desalination process and, more particularly, to a multiple-effect method and a multiple-effect system for co-generative desalination.

Description of Related Art

The "background" description provided herein is for the purpose of presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Desalination systems are known to address fresh water needs of coastal and remote areas. Desalination works on main principles of evaporation and condensation processes, where concentrated salt and other particulates are generally discarded. Currently, most desalination plants include a multi-effect distillation (MED) system which implements an efficient and reliable technology among known evaporative desalination technologies. MED involves several stages/effects of evaporation and condensation carried out between hot and cold ends, where temperature varies in a range of, for example, 70° C. to 20° C., with a single stage temperature drop being as low as 2.5° C. Steam from each stage/effect is transferred through pipes to a subsequent stage/effect, thereby serving as a source of heat and subsequently condensing into fresh water.

MED is executed via a natural cooling direction from a hot source to a cold sink, where evaporation of saline water takes place at high temperature and condensation of steam occurs at cold temperature. Amount of distilled water increases with an increase in number of intermediate stages. Industrial desalination process utilizes a combination of the MED and mechanical vapor compression (MVC), where the MVC creates a temperature gradient and the MED process is configured to utilize the temperature gradient for effective heat transfer and, thereby, for maximum freshwater generation.

However, the combination of the MED and the MVC may only be utilized for freshwater generation. The combination of such systems do not cater to heating/cooling benefits which is an additional requirement in regions (such as arid regions) with need for the freshwater generation. Heat energy generated due to the condensation can be dissipated to an external environment. In cold climates, heat energy is harvested from an outdoor environment and delivered to an indoor environment. In desalination, both heating and cooling are needed to perform paired evaporation-condensation processes. In HVAC cooling and heating, water is generated. However, MED systems cannot be used in conjunction with HVAC cooling and heating.

U.S Pat. No. 4,668,345A describes a process for converting saline water to freshwater by compressing freshwater vapor in a condensation chamber to create a pressure-temperature differential between the condensation chamber and an evaporation surface arranged above the condensation chamber. Fresh water droplets are vaporized, thereby separating the freshwater from the saline water in an evaporation chamber arranged above the evaporation surface. The freshwater droplets are transferred to a freshwater reservoir in a freshwater tank.

Chinese Patent Publication Number 110467233A describes a multi-effect seawater flash evaporation desalination system in which a water vapor compressor recovers steam heat of a first-effect flash evaporator and provides steam required for heating of seawater in a steam heater, and waste heat of freshwater present in multi-effect flash evaporators is recovered by a condensation chamber of the first-effect flash evaporator.

U.S Patent Publication Number 20210178281A1 describes a multi-stage flash reversal unit that includes an evaporation part configured to receive a water feed having a first temperature and to flash evaporate water from the water feed to form vapors; a condensation part that condenses the vapors to generate distilled water and outputs a concentrated water feed having a second temperature, which is lower than the first temperature; and a cooling unit that cools down the concentrated water feed.

U.S Pat. No. 9,539,522B1 describes a combination multi-effect distillation and multi-stage flash evaporation system in which a multi-stage flash evaporation system includes a plurality of flash evaporation/condensation stages, such that the multi-stage flash evaporation system receives a volume of seawater or brine from an external source and produces distilled water, and a multi-effect distillation system includes a plurality of condensation/evaporation effects, such that the multi-effect distillation system receives concentrated brine from the multi-stage flash desalination system and produces distilled water.

Chinese Patent Publication Number 211644660U describes a double-effect two-stage compression heat pump seawater desalination device in which seawater is frozen at the evaporator side to form ice without salt. The seawater is then heated and vaporized at a side of a second condenser to form vapor without salt, and then desalted seawater is heated by the two condensers to reach the boiling point for evaporation.

Further, "Allocation of thermal vapor compressor in multi effect desalination systems with different feed configurations" [Khalid et. al; Desalination, Volume 426, 15 Jan. 2018, Pages 164-173] describes a study involving Multi-Effect Desalination system with thermal vapor compression (MED-TVC) in which multiple evaporators are used where vapor is formed in each one using the heat generated from condensing steam/vapor in the previous effect, resulting in high Performance Ratio (PR). In this study, a mathematical model is developed to identify the optimum location of the thermal-vapor-compressor (TVC or ejector) attached to the Multi Effect Evaporation system.

"Wastewater desalination system utilizing a low-temperature heat pump" [Yang et. al; International Journal of Energy Research, 5 Oct. 2017] describes a wastewater desalination system based on a low-temperature air source heat pump which consists of the wastewater flow process and the heat pump cycle.

Each of the aforementioned references suffers from one or more drawbacks hindering their adoption. None of the references describe about inverting the known MED process which forces a thermal flow to move from cold temperature source to a high temperature sink, such that thermal energy (i.e., heat) can move toward a hot side by expending work by a compressor, for cogeneration of water purification and cooling/heating.

Accordingly, it is one object of the present disclosure to provide system and methods of a compressor-inverted MED process combining desalination and cooling/heating processes at the system level.

SUMMARY

In an exemplary embodiment, a multiple-effect method for desalination is provided. The method includes flowing saline water over a thermally conductive plate, where the thermally conductive plate forms a bottom surface of a first evaporation chamber in a first desalination chamber. The first desalination chamber is part of a vertical stack of desalination chambers. Each desalination chamber in the vertical stack of desalination chambers includes a condensation chamber located on top of an evaporation chamber. The method further includes heating the thermally conductive plate to evaporate the saline water, resulting in vapor. The method further includes removing the vapor from the first evaporation chamber and compressing, using a compressor, the vapor, thereby creating compressed vapor. The method further includes pumping the compressed vapor into a first condensation chamber in the first desalination chamber. The compressed vapor is at a higher initial temperature than a temperature of the first condensation chamber. The method further includes condensing the compressed vapor in the first condensation chamber, resulting in fresh water. The method further includes heating, by heat released by the condensing of the compressed vapor, a second thermally conductive plate forming a top of the first condensation chamber. The second thermally conductive plate forms a bottom surface of a next evaporation chamber in a next desalination chamber in the vertical stack of desalination chambers.

In some embodiments, the method further includes heating the first evaporation chamber to 20° C. In some embodiments, the method further includes cooling a last condensation chamber in the vertical stack of desalination chambers to 60° C.

In some embodiments, the method further includes maintaining an external pressure surrounding the vertical stack of desalination chambers wherein the external pressure is less than atmospheric pressure.

In some embodiments, the compressor is part of a compressor stack. In some embodiments, the compressor stack is driven by a single mechanical or electrical drive. In some embodiments, the method further includes matching a heat transfer rate in each compressor of the compressor stack.

In some embodiments, the method further includes removing non-condensable gases from the first condensation chamber. In some embodiments, the method further includes removing heat from an external environment surrounding the first evaporation chamber to evaporate the saline water. In some embodiments, the method further includes adding heat to an external environment surrounding the first condensation chamber by condensing the vapor.

In another exemplary embodiment, a multiple-effect system for desalination is provided. The system includes a vertical stack of desalination chambers. Each desalination chamber in the vertical stack of desalination chambers includes an evaporation chamber. A thermally conductive plate forms a bottom surface of the evaporation chamber. Each desalination chamber further includes a condensation chamber on top of the evaporation chamber, and a compressor. In such arrangement, saline water flows over the thermally conductive plate in the evaporation chamber. Further, the thermally conductive plate is heated to cause evaporation of the saline water, resulting in vapor. Subsequently, the vapor is compressed by the compressor, thereby creating compressed vapor. Further, the compressed vapor is pumped into the condensation chamber at a higher initial temperature than the condensation chamber. The compressed vapor condenses in the condensation chamber, resulting in fresh water. Heat released during condensation of the compressed vapor heats a second thermally conductive plate forming a top of the condensation chamber. Also, the second thermally conductive plate forms the bottom surface of a next evaporation chamber.

In some embodiments, the compressor includes a plurality of inlets and a plurality of outlets. In some embodiments, a stack of compressors is used to compress the vapor in the vertical stack of desalination chambers. In some embodiments, the stack of compressors is driven by a single mechanical or electrical drive.

In some embodiments, the condensation chamber includes a plurality of condensation surfaces.

In some embodiments, a temperature difference between each of the desalination chambers is approximately 2.5° C.

In some embodiments, the evaporation chamber and the condensation chamber are supported by pillars, and the pillars are thermal insulators.

In some embodiments, an external pressure surrounding the vertical stack of desalination chambers is less than atmospheric pressure.

In some embodiments, the system further includes a stack of distillation chambers. Each distillation chamber of the stack of distillation chambers comprises a saline water feed and a steam pipe. The saline water from the saline water feed is sprayed onto the steam pipe. Further, the saline water is heated by the steam pipe and evaporates. Steam in the steam pipe condenses when the saline water is sprayed onto the steam pipe, resulting in fresh water. Further, the evaporated saline water is collected and pumped into the steam pipe of a next distillation chamber in the stack of distillation chambers. In some embodiments, each distillation chamber has a lower temperature and a lower pressure than an immediately preceding distillation chamber.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
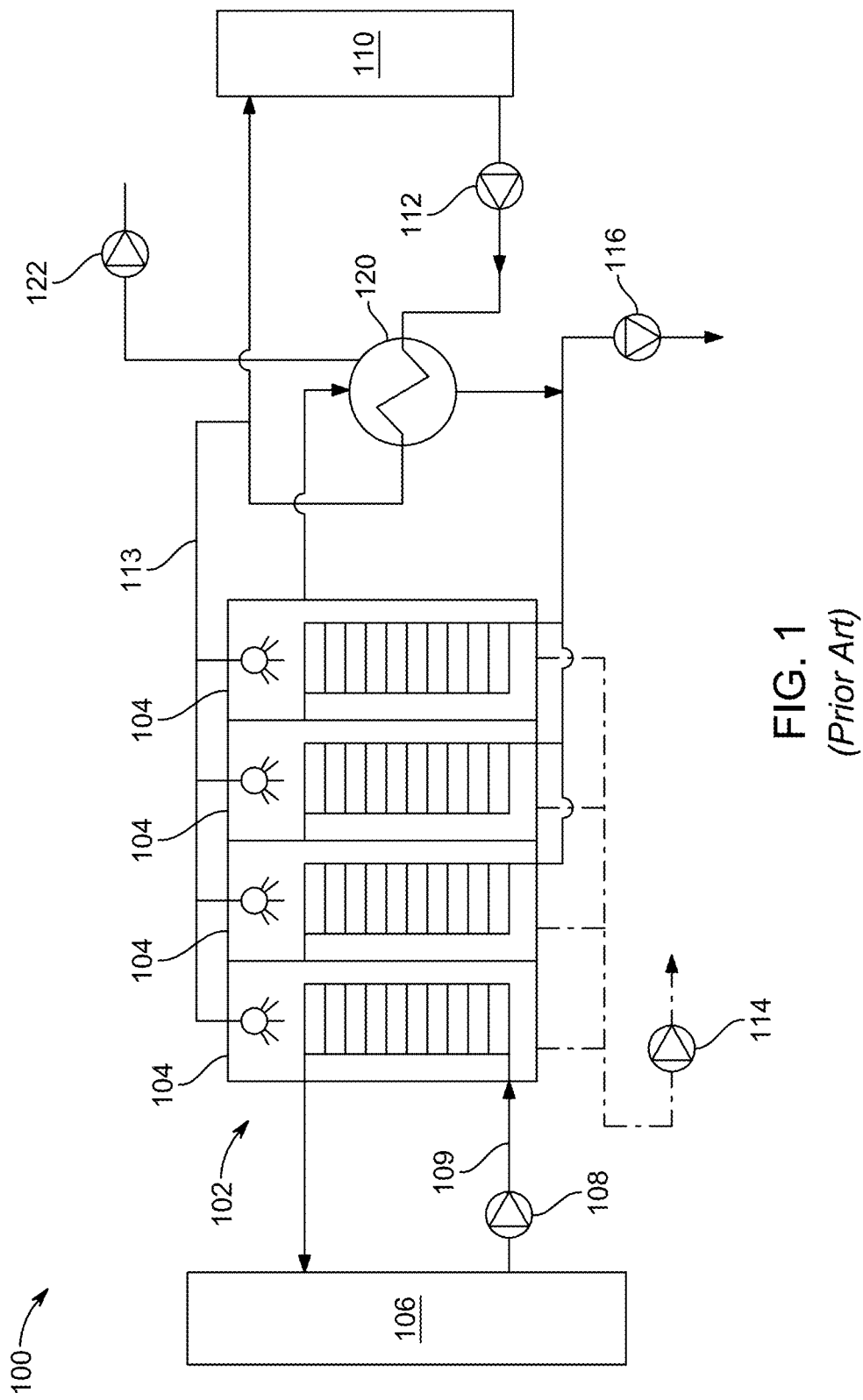
FIG. 1 is a schematic view of a multi-effect distillation (MED) system, according to prior art.

In the drawings, like reference numerals designate identical or corresponding parts throughout the several views. Further, as used herein, the words "a," "an" and the like carry a meaning of "one or more," unless stated otherwise.

Furthermore, the terms "approximately," "approximate," "about," and similar terms refer to ranges that include the identified value within a margin of 20%, 10%, or preferably 5%, and any values therebetween.

Aspects of this disclosure are directed to a multi-effect system and a multi-effect method combining cooling and desalination at a process level. In the present system and method, steam serves as a refrigerant in the compression process. The steam is generated from saline water by evaporation, which is then condensed as fresh water and removed as a secondary product of the process. The process is repeated over small temperature steps to multiply water productivity similarly to conventional multi-effect distillation (MED) Cogeneration of water purification and cooling permits distributed water purification, and a significant reduction in cost of desalination.

Referring to FIG. 1, a schematic of a conventional multi-effect distillation (MED) system 100 is illustrated. The MED system 100, as shown, is generally known in the art, and is utilized for an evaporative desalination process. In particular, MED is a thermal distillation technique having both industrial applications utilizing waste heat and small-scale applications coupled with electric heating units, fossil fuel burners or renewable energy sources. As illustrated, the MED system 100 includes a distillation arrangement 102 including one or more chambers 104 (four chambers 104 shown in the illustrated example). Each of the chambers 104 includes multiple stages (i.e., steps) to provide multiple evaporation steps. A sensible heat source 106 provides heat energy through a refrigerant (typically fresh water) passed, via a heat source pump 108, and through a steam pipe 109, to each of the multiple stages in each of the chambers 104 in the distillation arrangement 102. Further, saline water from a saline water source 110 is pumped, via a saline water pump 112, into a saline water feed 113. The feed 113 sprays the saline water into each of the chambers 104 in the distillation arrangement 102.

In the MED system 100, the sprayed saline water gets evaporated due to the heat supplied to the chambers 104 by the steam pipe 109. Specifically, each of the chambers 104 acts as a concurrent heat exchanger that uses secondary steam, generated in the previous stage, to evaporate water by condensing steam into the heat exchanger of a current stage, thus producing desalinated water. In particular, the steam from each chamber 104 (effect) is transferred through pipes to a subsequent chamber 104 serving as a source of heat and condensing into fresh water simultaneously. In some examples, before flowing to the next stage, generated vapor first flows through a mist separator (not shown) which removes entrained brine droplets. Each intermediate stage reuses the heat from the previous stage, while the first and last stages may need external heating and cooling, respectively (as described). The generated brine is rejected, for example, into seawater or the like, via a brine blowdown pump 114. Further, the generated fresh water is suctioned out of the chambers 104, via a distillate pump 116, to be collected in a fresh water tank (not shown).

In some examples, the saline water, before being sprayed the chambers 104, is passed through a condenser 120. Further, the steam remaining in the chambers 104 (containing remaining fresh water) is passed through the condenser 120. The steam is condensed in the condenser 120 to be supplied as fresh water to the fresh water tank via the distillate pump 116. Heat released by the condensation of the steam is used to heat the saline water before supplying to the chambers 104, thus reducing heat energy required and thereby promoting evaporation of sprayed saline water in the chambers 104. The condenser 120 is coupled with a vacuum pump 122 to aid near vacuum condition therein and to allow condensation of the steam. The vacuum pump 122 also aids removal of non-condensable gases that are dissolved in fresh water (as in all evaporative techniques). Any extra saline water in the condenser 120 is supplied back to the saline water source 110. Such pre-treatment of the saline water for multiple effect distillation is similar to that used in multi-stage flash plants.

Figure 2:
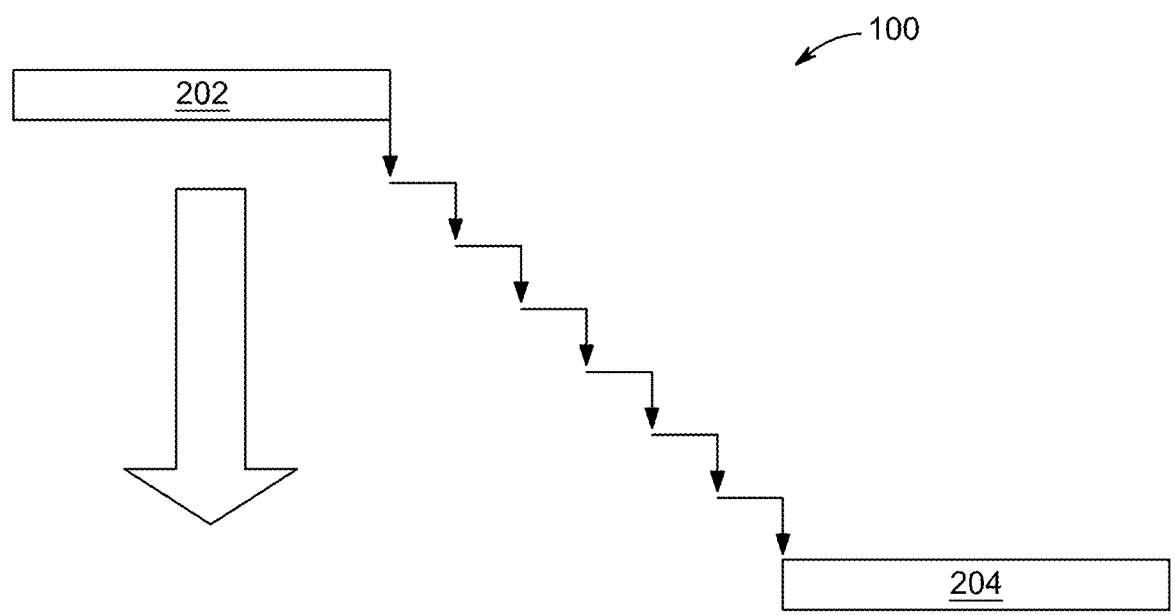
FIG. 2 is a simplified process flow diagram of the MED system of FIG. 1, according to prior art.

Referring to FIG. 2, a simplified process flow diagram for the MED system 100 is illustrated. As seen in FIG. 2, the MED system 100 works based on the natural cooling direction, that is from a hot source 202 to a cold sink 204, where evaporation of saline water occurs at high temperature and condensation of steam at cold temperature. In general, the MED system 100 employs several stages/effects of evaporation and condensation operating between the hot source 202 (typically at 60° C. to 70° C.) and the cold sink 204 (typically at 20° C.) with a single stage temperature drop being as low as 2.5° C. As discussed, the steam from each stage/effect is transferred to a following stage/effect, thereby serving as a source of heat. The conventional MED system 100 uses the temperature gradient for achieving evaporation of saline water at high temperature and condensation of steam at cold temperature.

Figure 3:
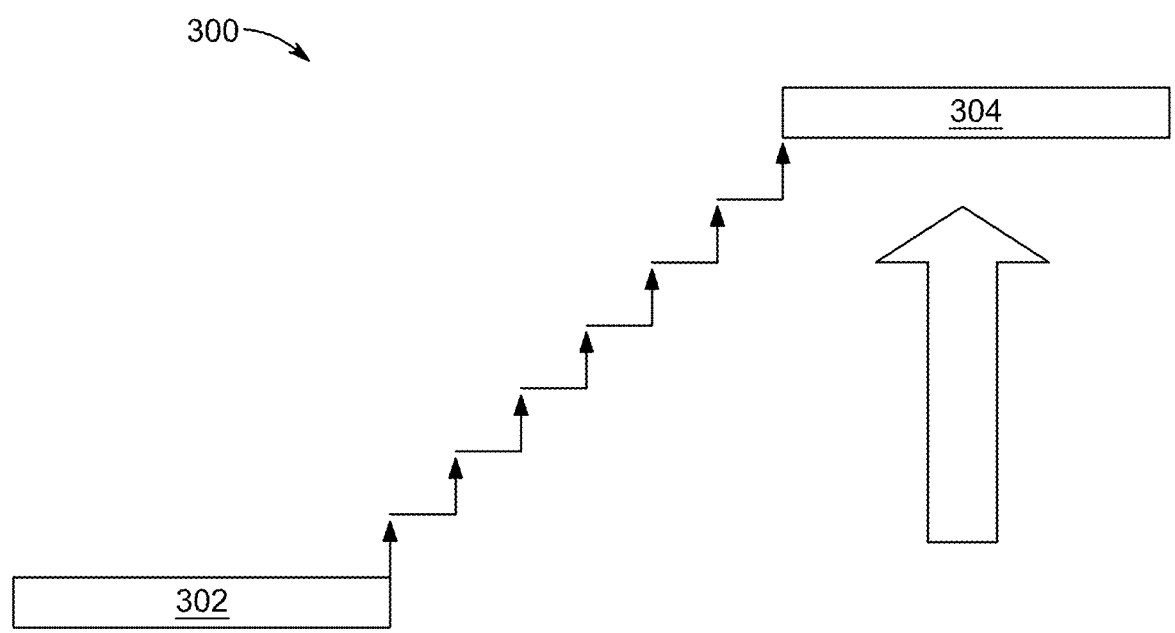
FIG. 3 is a simplified process flow diagram for a multiple-effect system for desalination, according to certain embodiments of the present disclosure.

Referring now to FIG. 3, a simplified process flow diagram for a multiple-effect system 300 is illustrated, according to embodiments of the present disclosure. In the multiple-effect system 300 (hereinafter alternatively referred to as "the system 300"), the process flow of the MED system 100 (as illustrated in FIG. 2) is inverted to force the thermal flow to move from a cold temperature source (such as a cold source 302) to a high temperature sink (such as a hot sink 304). The conventional MED system 100 (FIG. 2) uses the temperature gradient and the multiple-effect system 300 (FIG. 3) creates the temperature gradient. In other words, while the conventional MED system 100 degrades heat from high to low temperatures, the present multiple-effect system 300 upgrades heat from low to high temperatures. In the system 300, the process is repeated over small temperature steps (utilizing multiple stages) to multiply water productivity.

In the system 300, the thermal energy (heat) is moved from the cold source 302 towards the hot sink 304 by expending work by a compressor (as discussed later in more detail). In particular, the system 300 utilizes several stages (i.e., a cascade of steps) and each stage requires a compression process. Several types of compressor configurations may be implemented for achieving the compression process. Hereinafter, the system 300 is an inversion of the existing MED system 100 using the compression effect. As such, the system 300 is interchangeably referred to as the "compressor-inverted MED" in the present disclosure.

Figure 4:
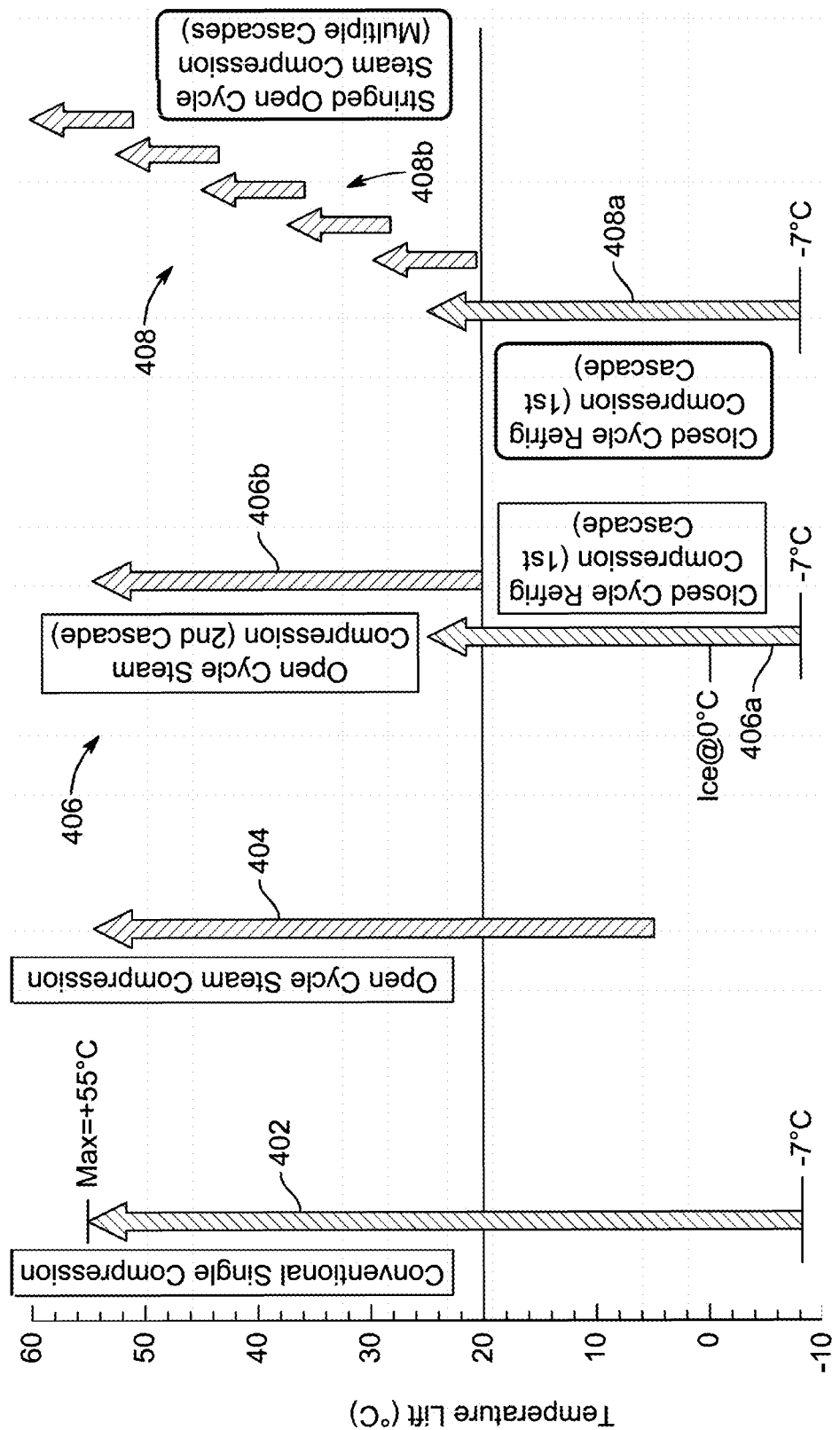
FIG. 4 is a graphical representation showing comparison of various cooling processes as implemented with thermal desalination techniques for a multiple-effect system and single-effect systems according to certain embodiments of the present disclosure.

FIG. 4 is a graphical representation 400 showing comparison of various cooling processes as may be implemented, for some, with thermal desalination techniques, including the present multiple-effect system 300 (as described in reference to FIG. 3). In particular, the graphical representation 400 of FIG. 4 depicts a thermal lift (or thermal range) of the various cooling processes. In FIG. 4, the thermal lift for a conventional cooling process (as represented by an arrow 402) indicates rejection of heat, for example from a cold interior of a building to a hot exterior in the summer. It may be understood for such conventional single compression cooling process 402, heating in winter is similar with the sink and the source exchanged. Further, in FIG. 4, the thermal lift for an open cycle steam compression process (as represented by an arrow 404) originates from saline water and condensed into produced fresh water in an open cycle.

In some embodiments, multiple compression steps may be included. For example, in FIG. 4, the thermal lift for a compression process includes two cascades (as represented by an arrow set 406). In one embodiment, the compression may be a compression of a chemical refrigerant. In the chemical refrigerant compression process 406, a first cascade (as represented by an arrow 406a), which is a closed cycle, allows the refrigerant compression, such that a second cascade (as represented by an arrow 406b), which is an open cycle (for steam compression), may begin from a higher source temperature (for example, around 20° C.) to avoid excessive specific volume of steam at low temperatures (for example, 157 m$^3$/kg at 4° C.).

Further, in FIG. 4, the thermal lift for a stringed steam compression process may include multiple cascades (as represented by an arrow set 408). In the stringed steam compression process 408, a first cascade (as represented by an arrow 408a), which is a closed cycle, allows the chemical refrigerant compression. Further, a series or a cascade of compressions is implemented in an open-cycle steam compression (as represented by a group of arrows 408b). Herein, the water generated from the open-cycle steam compression 408b is multiplied by the number of stages therein. For example, if compressing steam directly from 20° C. to 60° C. generates 1 m$^3$ of water, then a cascade of 2.5° C. stages for the same temperature gradient of 40° C. (60° C.-20° C.) may generate 16 m$^3$ of water. So, there is significant 16X potential for multiplication of water productivity, while the stringed steam compression process 408 may still achieve cooling with generally similar energy cost. It may be understood that the given temperature step of 2.5° C. is the current state of the art for the smallest step in conventional MED systems (such as, the MED system 100). In one embodiment, there may be larger temperature steps and/or fewer steps or cascades. In one embodiment, there may be smaller steps than 2.5° C.

Figure 5A:
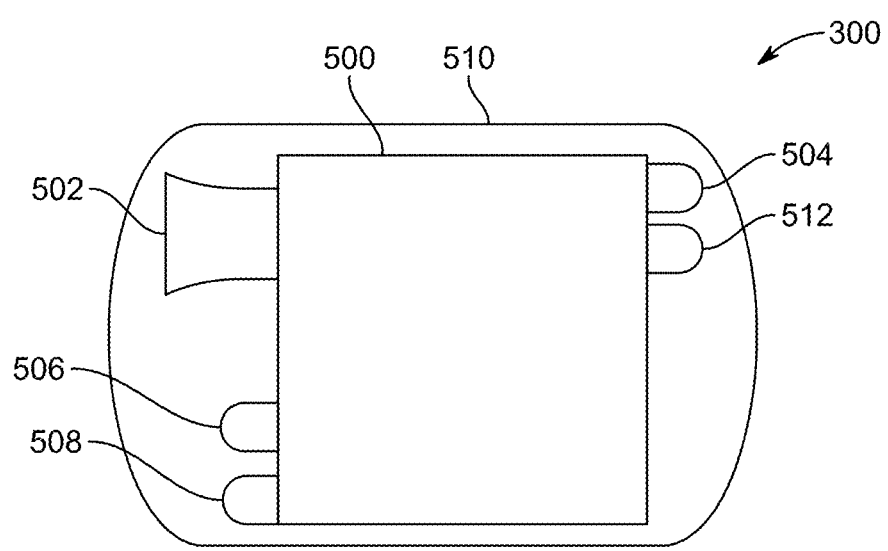
FIG. 5A is a top plan view of the multiple-effect system, according to certain embodiments of the present disclosure.

FIG. 5A illustrates a top plan view of the system 300 for desalination. As shown, the system 300 includes a vertical stack of desalination chambers 500 coupled to a compressor 502. The system 300 further includes a first set of valves (represented by reference numeral 504) to feed saline water to the vertical stack of desalination chambers 500, such as from a saline water source (not shown). The system 300 also includes a second set of valves (represented by reference numeral 506) to collect generated fresh water from the vertical stack of desalination chambers 500, and a third set of valves (represented by reference numeral 508) to remove remainder brine from the vertical stack of desalination chambers 500.

In one or more examples, an external pressure surrounding the vertical stack of desalination chambers 500 is less than atmospheric pressure. In one embodiment, the water at inlet may be between approximately 20° C. and approximately 60° C. for a steam saturation pressure of approximately 0.02 to approximately 0.18 bar, as shown in FIG. 7B. In one embodiment, it may be preferred for the steam saturation pressure to be maintained at approximately 0.10 bar to minimize the average pressure difference between the inside of the chamber and the outside of the chamber. In one embodiment, the pressure may be maintained at a lower value (e.g., 0.02 bar) to create a pressure differential pointing outward from the inside to the outside of the chambers, thus simplifying the mechanical design of the chambers.

In an embodiment, the system 300 includes an external enclosure 510 surrounding the vertical stack of desalination chambers 500 and the components associated thereto. The system 300 further includes a fourth set of valves (represented by reference numeral 512) coupled to the vertical stack of desalination chambers 500 and to a vacuum pump (not shown) for vacuuming the chambers from air prior to initial operation. The vacuum valves are intermittently applied to the chambers to remove non-condensable gases found dissolved in water and released from it during the evaporation. Another valve for vacuuming the chamber 510 may be a part of the stack of valves 512. It may be understood that the set of valves 504, 506, 508, 512 may be operated as per the corresponding duty cycles in the system 300.

In some embodiments, the vertical stack of desalination chambers 500 may be configured to ensure that the seals therein are tight to prevent leakage therefrom. In an example, the vertical stack of desalination chambers 500 is made vapor tight, and pre-vacuumed from non-condensable gases. Further, the non-condensable gases that may accumulate over time are removed on regular basis by using the fourth set of valves 512 in conjunction with the vacuum pump. The vertical stack of desalination chambers 500 also includes a thermally conductive base and supported by thermally insulated structures.

Figure 5B:
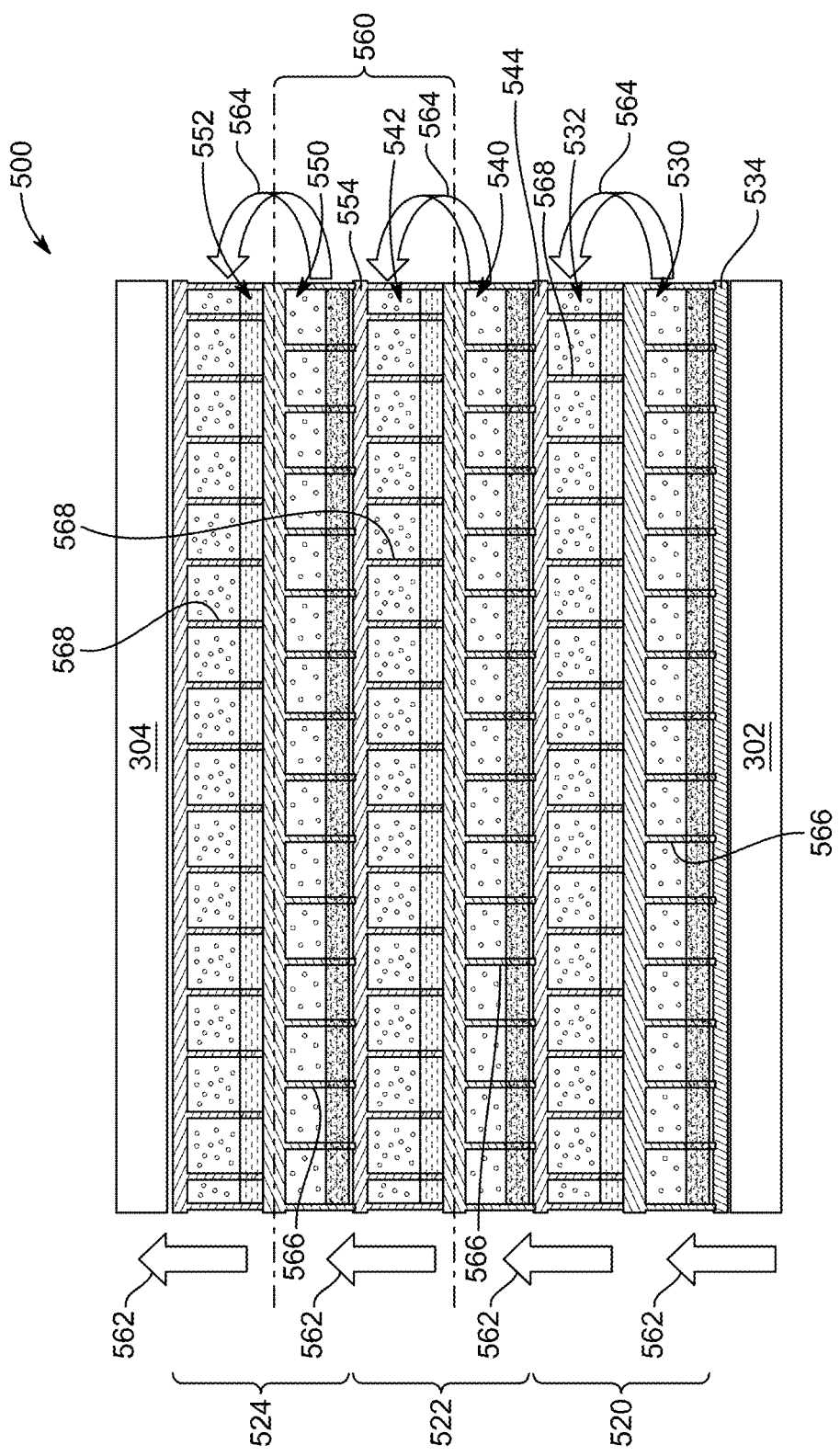
FIG. 5B is an exemplary cross-sectional view of a vertical stack of desalination chambers for the multiple-effect system of FIG. 5A, depicting process flow therein, according to certain embodiments of the present disclosure.

FIG. 5B illustrates an exemplary cross-sectional view of the vertical stack of desalination chambers 500 of the system 300 of the present disclosure. The vertical stack of desalination chambers 500 are disposed between a cold source (similar to the cold source 302) and a hot sink (similar to the hot sink 304) and include multiple desalination chambers. In the illustrated embodiment, the vertical stack of desalination chambers 500 includes, but is not limited to, three desalination chambers, such as a first desalination chamber 520, a second desalination chamber 522 and a third desalination chamber 524. Each desalination chamber 520, 522, 524 includes a lower evaporation chamber and an upper condensation chamber. The evaporation chamber is a saline evaporation chamber wherein the evaporation chamber may receive sensible heat and loses latent heat. The condensation chamber is a freshwater condensation chamber wherein the condensation chamber may receive latent heat and lose sensible heat. The number of desalination chambers may be determined based on the temperature gradient between the hot sink 304 and the cold source 302 across the vertical stack of desalination chambers 500. For instance, with the hot sink 304 at 60° C. and the cold source 302 at 20° C., and a cascade of 2.5° C. between the immediate desalination chambers of the vertical stack of desalination chambers 500, the number of desalination chambers would be 16 ((60° C.-20° C.)/2.5).

In the vertical stack of desalination chambers 500, evaporation and condensation take place in separate rectangular chambers in each of the desalination chambers 520, 522, 524. The first desalination chamber 520 includes a first evaporation chamber 530 and a first condensation chamber 532, the second desalination chamber 522 includes a second evaporation chamber 540 and a second condensation chamber 542, and the third desalination chamber 524 includes a third evaporation chamber 550 and a third condensation chamber 552. Further, in the vertical stack of desalination chambers 500, each of the condensation chambers 532, 542, 552 is located on top of the respective evaporation chamber 530, 540, 550. That is, in the first desalination chamber 520, the first condensation chamber 532 is located on top of the first evaporation chamber 530; in the second desalination chamber 522, the second condensation chamber 542 is located on top of the second evaporation chamber 540; and in the third desalination chamber 524, the third condensation chamber 552 is located on top of the third evaporation chamber 550.

Further, each of the evaporation chamber 530, 540, 550 includes a thermally conductive plate. As a non-limiting example, the conductive plate may be made from aluminum, magnesium, and/or silicon carbide. Additional conductive materials may also be compatible with the conductive plate. In one embodiment, the thickness of the conductive plate may allow for thermal conductivity while withstanding pressure differentials between the evaporation chamber and the condensation chamber. For example, the first evaporation chamber 530 includes a first thermally conductive plate 534, the second evaporation chamber 540 includes a second thermally conductive plate 544, and the third evaporation chamber 550 includes a third thermally conductive plate 554. Each thermally conductive plate 534, 544, 554 forms a bottom surface of the respective evaporation chamber 530, 540, 550. In a stacked configuration, the first thermally conductive plate 534 is disposed in contact with the cold source 302, the second thermally conductive plate 544 forms a top (i.e., top surface) of the first condensation chamber 532, and the third thermally conductive plate 554 forms a top (i.e., top surface) of the second condensation chamber 542. Further, as shown in FIG. 5B, a top (i.e., top surface) of the third condensation chamber 552 is disposed in contact with the hot sink 304.

In one embodiment, each desalination chamber includes a condensation chamber stacked atop an evaporation chamber. The condensation chamber and the evaporation chamber may be separated by a non-conducting plate forming the bottom of the condensation chamber and the top of the evaporation chamber. The non-conducting plate may be a structural or mechanical support. In one embodiment, the non-conducting plate may be a thermal insulator or separation. Thus, it may be preferred for the non-conducting plate to be thicker than the conducting plate. The non-conducting plate may be plastic. The condensation chamber may be a conductive chamber, wherein structures in the condensation chambers may be thermally conductive. In one embodiment, the evaporation chamber may be a thermally insulating chamber.

The system 300 creates the temperature gradient therein. The temperature gradient is created by applying compression (by use of the compressor 502) to steam within each stage, specifically between the evaporation chamber 530, 540, 550 and the respective condensation chamber 532, 542, 552. It may be understood that the temperature gradient is created between two consecutive stages, for example, the stage corresponding to the second desalination chamber 522 and the stage preceding thereto (i.e., the first desalination chamber 520), as well as the second desalination chamber 522 and the stage proceeding thereto (i.e., the third desalination chamber 524).

Figure 5C:
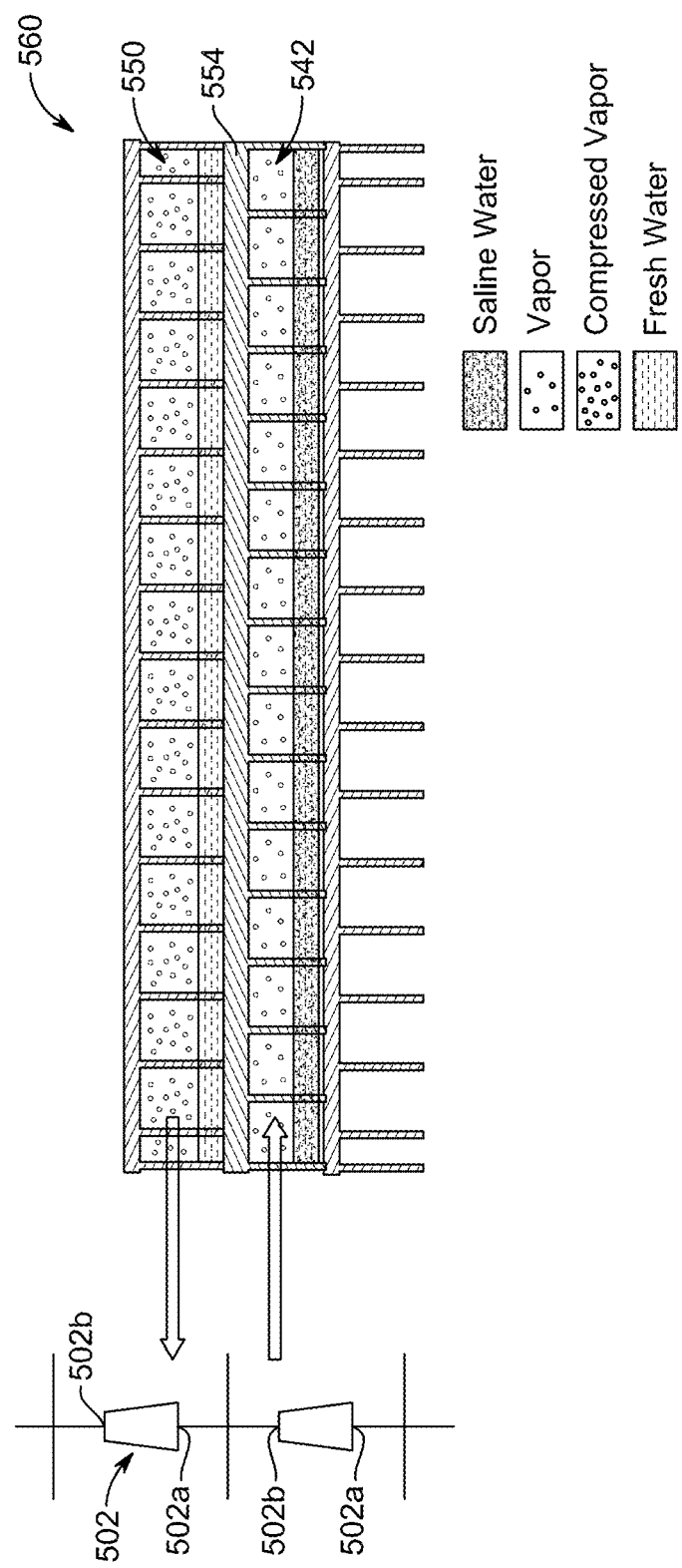
FIG. 5C is an exemplary cross-sectional view of a portion of the vertical stack of desalination chambers of FIG. 5B coupled to a compressor, according to certain embodiments of the present disclosure.

FIG. 5C illustrates an enlarged view of a portion 560 in FIG. 5B with the stages shown therein being coupled to the compressor 502. For explanation purposes, the portion 560 depicts the second condensation chamber 542 of the second desalination chamber 522 and the third evaporation chamber 550 of the third desalination chamber 524 being coupled to the compressor 502.

As described earlier, the conventional MED system 100 (as described in reference to FIGS. 1-2) is driven by two temperature sources and the internal structure of the system follows the natural temperature gradient. In contrast, the system 300 (i.e., the compressor-inverted MED) creates the temperature gradient that forces heat to flow from a cold source toward hot sink. As such, compression needs to be applied between stages/effects to force the heat exchange against the temperature gradient. To achieve this, evaporation and condensation take place in separate flat chambers (like the evaporation chambers 530, 540, 550 and the condensation chambers 532, 542, 552) with compression in between the two stages. The saline water is supplied as a film on top of a thin and flat metallic plate (i.e., the thermally conductive plates 534, 544, 554). The thermally conductive plates 534, 544, 554 are heated by condensation from a metallic foam or thin fins in the chamber below, and the generated water vapor is pumped into or out of each chamber. The metallic foam or thin fins may provide condensation surfaces for water vapor. In one embodiment, the metallic foam or thin fins may be thermally connected to the conductive plates. In one embodiment, the pillars 568 may also be conductive and may also aid condensation. In one embodiment, the pillars may be metallic in fresh water to reduce corrosion risk. Sensible heat (as represented by arrows 562 in FIG. 5B) flows across the thermally conductive plates 534, 544, 554. Further, exchange of latent heat (as represented by arrows 564 in FIG. 5B) is forced by the compression of vapor provided by the compressor 502. That is, there are also two internal heat exchange layers from fresh to saline chambers, and two external heat exchanges for heat provision and heat rejection. The vertical stack of desalination chambers 500 may be considered as layers of natural and forced heat exchanges; or in other words, as layers of sensible and latent heat exchanges.

In one embodiment, the saline water is supplied as a film with even distribution across the thermally conductive plates. In one aspect, the saline water may be injected into a rectangular chamber from at least one side wall of the chamber. The at least one side wall of the chamber can be any of the surfaces of the evaporation chamber except the base of the chamber and the top of the chamber. In one aspect, the saline water may be supplied to the evaporation chamber via a manifold. The saline water may be supplied to each chamber by a set of openings and/or valves. In one aspect, a pump may be attached to each of the set of openings. In one aspect, a valve may be attached to each of the set of openings. In one aspect, the saline water may be supplied to each chamber at one end of the chamber. The geometry of the chamber may be configured to enable flow of the saline water as a film. For example, the base of the evaporation chamber may be sloped.

In a particularly preferred embodiment, the sidewall of each chamber has a bottom fritted metal portion directly adjacent to the floor of the chamber. This portion of the peripheral sidewalls of the chamber has a height of from 0.05 to 0.2 times the total interior height of the chamber. The porosity fritted metal portion is preferably 10-50 µm and functions to provide uniform saline water flow around the bottom periphery of the chamber. The fitted metal portion surrounds the base of the chamber and is in contact with the base. The fritted metal portion is in contact with a continuous pipe or manifold on outside of the chamber in which a portion of the manifold or pipe consists of the fritted metal portion. In one embodiment, the base of the chamber may be tilted such that the higher side of the base is the feed side (e.g., the side with a fritted distribution pipe) and the lower side of the base is where water may be collected to be discharged to an exit valve 508. In another aspect, the saline water may be supplied to the chamber from openings wherein the openings are evenly spaced around the chamber. In an example embodiment, the openings may be evenly spaced across the four side walls of the chamber. In another embodiment, the openings may be evenly spaced across opposite side walls of the chamber. The openings may be located in the bottom half of the chamber, e.g., closer to the base of the chamber than the top of the chamber. In another embodiment, the saline water may be supplied to the chamber from the top of the chamber and/or the base of the chamber. For example, the saline water may be supplied through at least one opening in the ceiling of the chamber.

In particular, as may be understood from FIG. 5B in combination with FIG. 5C, in the vertical stack of desalination chambers 500, the saline water flows over the thermally conductive plates 534, 544, 554 of the evaporation chambers 530, 540, 550. The saline water is supplied by the first set of valves 504. The first set of valves 504 may be arranged in a stacked configuration, corresponding to the vertical stack of desalination chambers 500, to enable parallel supply of the saline water to each of the thermally conductive plates 534, 544, 554. In the first evaporation chamber 530, the first thermally conductive plate 534 is heated to cause evaporation of the saline water, resulting in vapor. In an example, the first evaporation chamber 530, or specifically the first thermally conductive plate 534, is heated to about 20° C. (typical temperature of the cold source 302). Then, the vapor is compressed by the compressor 502, thereby creating compressed vapor. The compressed vapor is pumped from the compressor 502 into the first condensation chamber 532. The compressed vapor is at a higher initial temperature than a temperature of the first condensation chamber 532. Due to the temperature difference, the compressed vapor condenses in the first condensation chamber 532, resulting in fresh water. Such condensation process results in release of heat in the first condensation chamber 532.

Now, since the second thermally conductive plate 544 forms the top of the first condensation chamber 532, the heat released due to the condensation process in the first condensation chamber 532 may heat the second thermally conductive plate 544. Also, as discussed, the second thermally conductive plate 544 forms the bottom surface of a next evaporation chamber, i.e., the second evaporation chamber 540. In the second evaporation chamber 540, the heat provided to the second thermally conductive plate 544 cause evaporation of the saline water, resulting in vapor. Then, the vapor is compressed by the compressor 502, thereby creating compressed vapor. The compressed vapor is pumped from the compressor 502 into the second condensation chamber 542. The compressed vapor is at a higher initial temperature than a temperature of the second condensation chamber 542. Due to the temperature difference, the compressed vapor condenses in the second condensation chamber 542, resulting in fresh water. Such condensation process results in release of heat in the second condensation chamber 542.

Further, as discussed, since the third thermally conductive plate 554 forms the top of the second condensation chamber 542, the heat released due to the condensation process in the second condensation chamber 542 may heat the third thermally conductive plate 554. Also, as discussed, the third thermally conductive plate 554 forms the bottom surface of a next evaporation chamber, i.e., the third evaporation chamber 550. In the third evaporation chamber 550, the heat provided to the third thermally conductive plate 554 cause evaporation of the saline water, resulting in vapor. Then, the vapor is compressed by the compressor 502, thereby creating compressed vapor. The compressed vapor is pumped from the compressor 502 into the third condensation chamber 552. The compressed vapor is at a higher initial temperature than a temperature of the third condensation chamber 552. Due to the temperature difference, the compressed vapor condenses in the third condensation chamber 552, resulting in fresh water. Such condensation process results in release of heat in the third condensation chamber 552. The heat generated in the third condensation chamber 552 is passed to the hot sink 304 placed on top thereof and in contact therewith. In an example, the last condensation chamber, i.e., the third condensation chamber 552 in the vertical stack of desalination chambers 500 is cooled to about 60° C. (typical temperature of the hot sink 304).

In an example, the vertical stack of desalination chambers 500 is made of plastic or the like material. The plastic material may be adequate as the relative pressure differences between the evaporation chambers 530, 540, 550 and the respective condensation chambers 532, 542, 552 are generally low. In an embodiment, as illustrated in FIG. 5B and FIG. 5C, the evaporation chambers 530, 540, 550 are supported by pillars 566 and the condensation chambers 532, 542, 552 are supported by pillars 568. In an example, the pillars 566 of the evaporation chambers 530, 540, 550 are staggered with respect to the pillars 568 of the condensation chambers 532, 542, 552 to enhance the structural integrity. The pillars 566 support the structures counteracting the bulging upward from the lower high-pressure evaporation chambers 530, 540, 550, and the pillars 568 support the structures counteracting the bulging downward from the upper low-pressure condensation chambers 532, 542, 552 for each of the desalination chambers 520, 522, 524. It may be appreciated that although the relative pressure differences are low, the pillars 566 and the pillars 568 ensure the mechanical integrity of the vertical stack of desalination chambers 500. Although in the present examples, both the evaporation chambers 530, 540, 550 and the condensation chambers 532, 542, 552 have been described to include pillars (i.e., the pillars 566 and the pillars 568, respectively); in alternate embodiments, only the evaporation chambers 530, 540, 550 may include the pillars 566, or only the condensation chambers 532, 542, 552 may include the pillars 568.

The pillars may be composed of varying materials depending on where the pillars are located in the desalination chamber. For example, pillars 566 in chambers containing saline water may be plastic pillars in order to reduce corrosion. Pillars 568 in chambers containing fresh water may be metallic to conduct heat from the bottom of the chamber to the top surface. In one embodiment, the pillars 568 may be plastic.

In some embodiments, the pillars 566 and the pillars 568 may function as thermal insulators to prevent direct heat transfer between the evaporation chambers 530, 540, 550 and the respective condensation chambers 532, 542, 552. In non-limiting examples, the pillars 566 and the pillars 568 may be made from plastic or Teflon. According to an aspect, a pressure ratio of one distillation chamber 520, 522, 524 to an adjacent distillation chamber is less than 1.20, which allows the intermediate thermally conductive plates 534, 544, 554, and plastic structures, including the pillars 566 and the pillars 568, to have minimum thickness. Such thickness of the structures may minimize usage of plastic material in the system 300 and may maximize heat exchange through the metallic thermally conductive plates 534, 544, 554. In one or more embodiments, each of the condensation chambers 532, 542, 552 includes a plurality of condensation surfaces which are thermally connected to the conducting plates. In one embodiment, the condensation surfaces may be supported by the bottom non-conducting plate or may be affixed to the conducting plates. The condensation surfaces may be metallic foam. In one embodiment, the condensation surfaces may be flat metallic strips that act like pillars. The plurality of condensation surfaces provide more surface area to allow faster condensation of the compressed vapors in the condensation chambers 532, 542, 552. In an example, the pillars 568 may add to the plurality of condensation surfaces to enable faster condensation of the compressed vapors in the condensation chambers 532, 542, 552. In other examples, the plurality of condensation surfaces may be provided by using fins (not shown) or the like in the condensation chambers 532, 542, 552.

Referring to FIG. 5A through FIG. 5C, in combination, the generated fresh water is collected from the condensation chambers 532, 542, 552 via the second set of valves 506. For this purpose, the second set of valves 506 may be arranged in a stacked configuration, corresponding to the vertical stack of desalination chambers 500, to enable collection (extraction) of the fresh water from each of the condensation chambers 532, 542, 552. Also, the remainder brine is removed from the evaporation chambers 530, 540, 550 via the third set of valves 508. For this purpose, the third set of valves 508 may be arranged in a stacked configuration, corresponding to the vertical stack of desalination chambers 500, to enable removal (extraction) of the brine from each of the evaporation chambers 530, 540, 550. Further, the fourth set of valves 512 may be arranged in a stacked configuration, corresponding to the vertical stack of desalination chambers 500, to pump out the non-condensable gases from the vertical stack of desalination chambers 500. The fourth set of valves 512 pre-evacuate the chambers and help maintain low pressure in the individual chambers as well as guard against accumulation of non-condensable gases. The external enclosure can be considered as an additional chamber requiring one more vacuum valve in the set of valves 512 in the desalination chambers 520, 522, 524, to promote evaporation of the saline water in the evaporation chambers 530, 540, 550 and the condensation of vapors in the condensation chambers 532, 542, 552. The use of the external enclosure 510 may reduce the structural strength requirements on the material as it places the vertical stack of desalination chambers 500 in the low pressure environment rather than the atmospheric pressure.

In the system 300, the compression processes may be performed with a sectioned single compressor having a single driving motor but with multiple inputs and outputs of steam flow. In general, the multi-effect compression (as required for the present multi-effect system 300) requires as many compressors with small compression factors as the number of stages/effects. However, the same effect may also be achieved by adapting the compressor 502 to accept multiple inputs/outputs and be operated by a single mechanical/electrical drive. For example, as illustrated in the embodiment of FIG. 5C, the compressor 502 may include multiple compressors having a plurality of inlets (as represented by reference numeral 502a) and a plurality of outlets (as represented by reference numeral 502b). Further, since the specific volume of the steam changes with temperature, the volumetric flow rate may need to be proportional to the designed temperature for each stage.

In some embodiments, the compressor 502 includes a stack of compressors (as discussed below in detail with reference to FIG. 6A through FIG. 6D). In the system 300, the stack of compressors is used to compress the vapor in the vertical stack of desalination chambers 500. In some embodiments, the stack of compressors (compressor stack) is driven by a single mechanical or electrical drive, for simplicity of mechanical arrangement therefor. The compressors in the stack of compressors may be formed on the same material piece with multiple inputs and outputs and partitions between compression sections. In the present examples, the compressors in the stack of compressors may be operated on the same shaft or dual shafts with a single mechanical driver. Further, a power distribution system on independent compressors in the stack of compressors may include mechanical, hydraulic, or pneumatic linkage. For example, the mechanical linkage may be implemented to have the same rotational speed or particular speed values to have different volumetric flow rates for the compressors in the stack of compressors. In some embodiments, operational duty factors may be implemented to vary the speed of the compressors. For example, in a stack of compressors, one or more of the compressors may be turned off for a predefined time interval to reduce an average volumetric flow rate for a particular stage to maintain an overall constant thermal flow rate for the system 300.

Figure 6A:
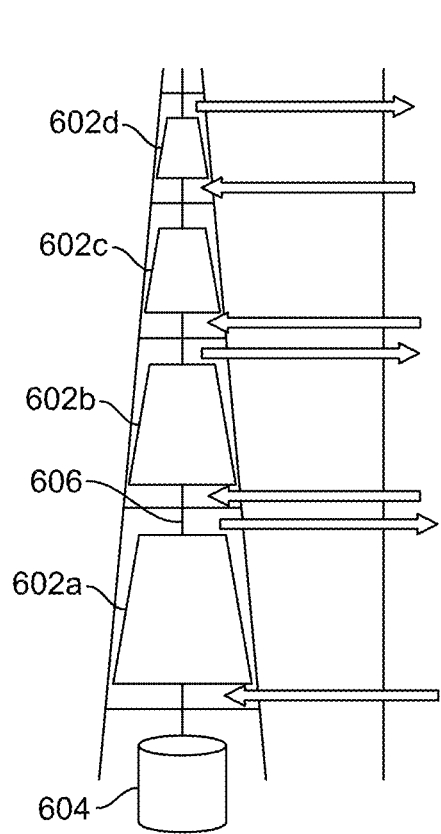
FIG. 6A is a schematic view of a stack of compressors for the multiple-effect system, according to a first embodiment of the present disclosure.

Referring to FIG. 6A, an exemplary compressor stack 600 includes four compressors 602a, 602b, 602c and 602d, according to a first embodiment. In the compressor stack 600, each of the four compressors 602a, 602b, 602c and 602d is coupled to a single motor 604 by a drive mechanism 606, for example, using a single shaft. It may be appreciated that the four compressors 602a, 602b, 602c and 602d may correspond to four stages of the system 300. Since each of the four compressors 602a, 602b, 602c and 602d may be driven by the single motor 604, the four compressors 602a, 602b, 602c and 602d are operated at same rotational speed. To compensate for the changes in specific volume of the steam across various stages, the four compressors 602a, 602b, 602c and 602d may vary in size, such that the corresponding intake volume size is lowered with higher temperature.

Figure 6B:
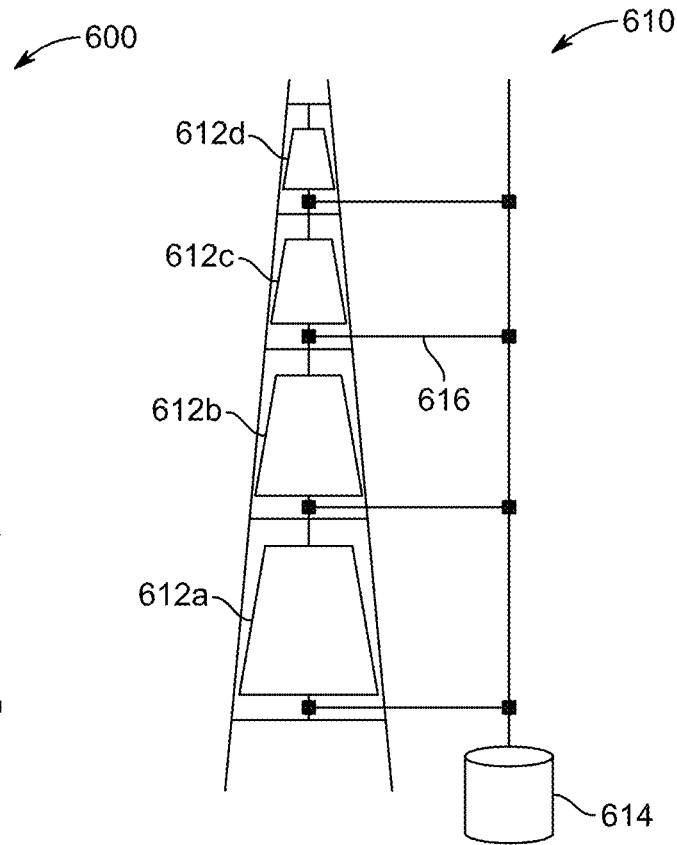
FIG. 6B is a schematic view of a stack of compressors for the multiple-effect system, according to a second embodiment of the present disclosure.

Referring to FIG. 6B, an exemplary compressor stack 610 is shown to include four compressors 612a, 612b, 612c and 612d, according to a second embodiment. The compressor stack 610 also includes a single motor 614. In contrast to the compressor stack 600 of FIG. 6A, the compressor stack 610 implements a drive mechanism 616 with a power distribution system using belts and gears, or hydraulic/pneumatic drive to achieve a spatial arrangement of the compressors 612a, 612b, 612c and 612d out of line with respect to the motor 614.

Figure 6C:
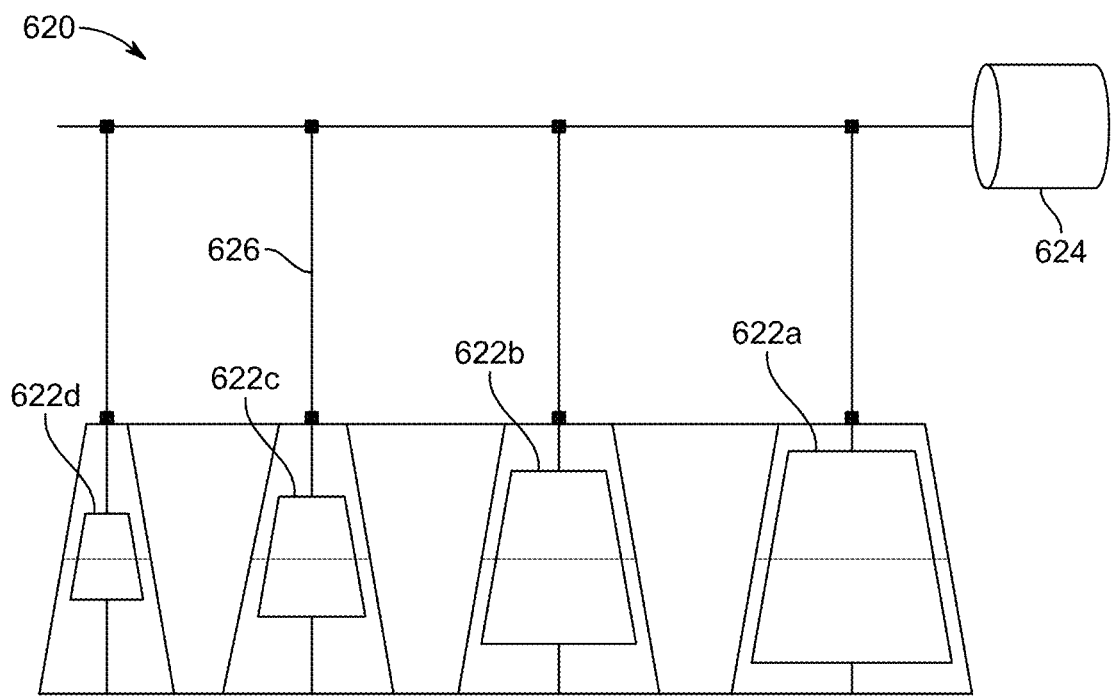
FIG. 6C is a schematic view of a stack of compressors for the multiple-effect system, according to a third embodiment of the present disclosure.

Referring to FIG. 6C, an exemplary compressor stack 620 is shown to include four compressors 622a, 622b, 622c and 622d, according to a third embodiment. The compressor stack 620 also includes a single motor 624. In contrast to the compressor stack 610 of FIG. 6B, the compressor stack 620 implements a drive mechanism 626 with a power distribution system using belts and gears, or hydraulic/pneumatic drive to achieve spatial arrangement of the compressors 622a, 622b, 622c and 622d such that the motor 626 is disposed along an orthogonal axis with respect to the compressors 622a, 622b, 622c and 622d.

Figure 6D:
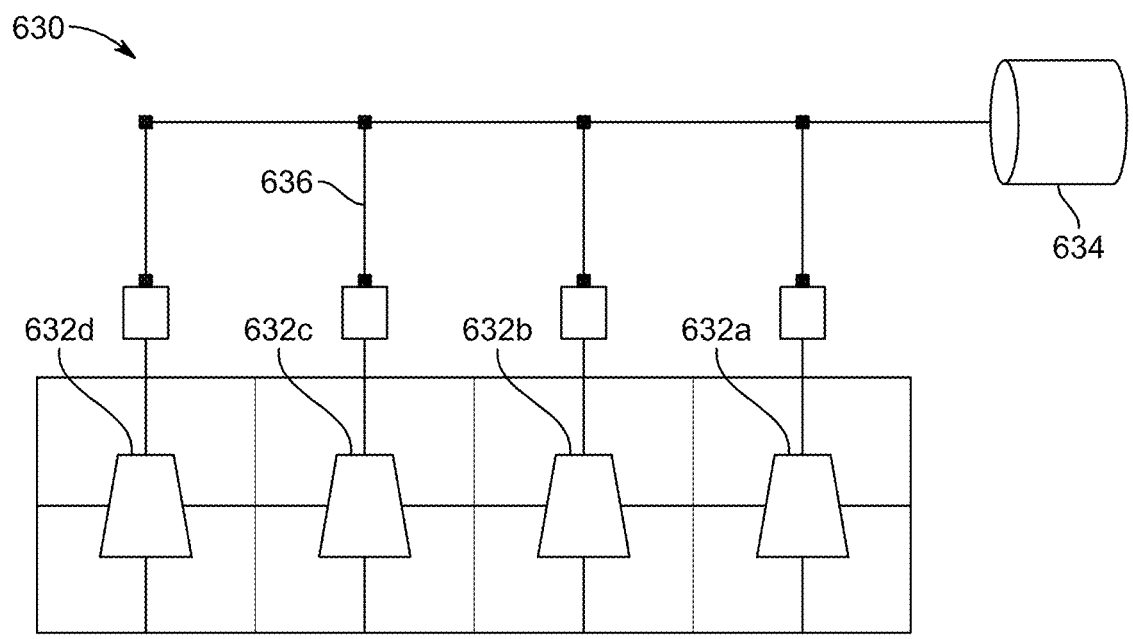
FIG. 6D is a schematic view of a stack of compressors for the multiple-effect system, according to a fourth embodiment of the present disclosure.

Referring to FIG. 6D, an exemplary compressor stack 630 is shown to include four compressors 632a, 632b, 632c and 632d, according to a fourth embodiment. The compressor stack 630 also includes a single motor 634. In contrast to the compressor stack 610 of FIG. 6B and the compressor stack 620 of FIG. 6C, the compressor stack 630 has the compressors 632a, 632b, 632c and 632d of same size (for easy manufacturability) and implements a drive mechanism 636 with a power distribution system using, for example, belts and gears, or hydraulic/pneumatic drive to achieve different rotational speeds for each of the compressors 632a, 632b, 632c and 632d, rather than those being of different sizes, to compensate for the changes in specific volume of the steam across different stages.

The system 300 consumes energy to transfer the thermal energy from low temperature source (i.e., the cold source 302) to the high temperature sink (i.e., the hot sink 304). It may be contemplated that the cold source 302 and the hot sink 304 are configured to set the temperature gradient across each stage. The heat is upgraded with each stage/effect using the compressor 502 with low compression ratio corresponding to temperature gradient of the corresponding stage. According to an aspect, the temperature gradient is a design parameter and may be in the range of 2.5-20° C.

In one or more embodiments, the temperature difference between each of the desalination chambers (like the desalination chambers 520, 522, 524) is approximately 2.5° C. In other words, the effectiveness of heat exchange limits a size of the stage to a few degrees, preferably 2.5° C. In a steady state of the system 300, the thermal flow across all the stages is equal. Since the specific volume changes with temperature, the volume flow rate of the steam may differ. With identical size and surface areas of the desalination chambers (like the desalination chambers 520, 522, 524), such difference in the volume flow rate may be nullified. Nevertheless, the temperature, the partial pressure and flow rate varies. Further, variation of specific volume may be considered for sizing of the compressor 502 (as discussed in the preceding paragraphs).

To understand the potential of the system 300, the smallest temperature step of 2.5° C. is used. Further, the analysis is expanded to include larger gradients which may be more practical in a development stage. Assuming the cold source 302 at 20° C. and the hot sink 304 at 60° C. with 2.5° C. effect size, a number of stages (N) may be given by:

$$N = \frac{T_{sink} - T_{source}}{\Delta T} = \frac{60 - 20}{2.5} = 16$$

$$N = \frac{T_{sink} - T_{source}}{\Delta T} = \frac{60 - 20}{10} = 4 \text{ (4 stages only)}$$

In one embodiment, the number of stages may be between 2 stages and 16 stages. In one embodiment, there may be more than 16 stages. Decreasing the number of stages may decrease capital costs of installation. Increasing the number of stages may increase water output productivity. In one embodiment, the cold source may be approximately 20° C. The cascade compressors 406a and 408a may be used for a cold source temperature of approximately 20° C. In one embodiment, the cold source may be colder or warmer than 20° C. In one embodiment, the system may include large compressors or high-speed compressors to handle the higher specific volume associated with a colder cold source. In one embodiment, the heat sink may be approximately 60° C. Temperatures greater than and less than 60° C. may also be compatible. A lower temperature may result in faster heat transfer. A higher temperature may result in greater water productivity. In one embodiment, the temperature of the heat sink may be higher than the surrounding/external environmental temperature in order to encourage expulsion of heat to the external environment. In one embodiment, the expulsion of heat may be used as part of an HVAC system, e.g., in cold environments.

work (for compressors in the compressor stack) in each stage decreases with increase in the stage inlet temperature thereof.

It may be contemplated by a person of ordinary skill in the art that the energy cost of the compression steps may be determined based on enthalpy changes of the vapor divided by the mechanical efficiency factor (assuming the compressor maintains the entropy (isentropic)), as:

$$E_{tot} = \frac{1}{\epsilon_{mechanical}} * \sum_{j=1}^{16} h_{j+1} - h_j$$

The analysis may be repeated assuming other temperature steps as well. Table 1 (below) gives summary calculations of water productivity and heat pumping and cooling efficiency for various temperature steps.

TABLE 1

| System Parameters | Unit | Value | Value | Value | Value | Value |
|---|---|---|---|---|---|---|
| Initial Temperature | C | 20.0 | 20.0 | 20.0 | 20.0 | 20.0 |
| Final Temperature | C | 60.0 | 60.0 | 60.0 | 60.0 | 60.0 |
| Temperature gradient | C | 2.5 | 5 | 10 | 20 | 40 |
| Stages | 1 | 16 | 8 | 4 | 2 | 1 |
| Average volume ratio | 1 | 1.14 | 1.31 | 1.71 | 2.93 | 8.53 |
| Average pressure ratio | 1 | 1.11 | 1.22 | 1.50 | 2.25 | 5.07 |
| Total energy needed | kJ/kg | 390 | 395 | 405 | 427 | 476 |
| Water produced | kg | 16.0 | 8.0 | 4.0 | 2.0 | 1.0 |
| Water energy cost | MJ/m3 | 24.3 | 49.2 | 100.6 | 211.5 | 475.8 |
| Water energy cost | kWh/m3 | 6.8 | 13.7 | 27.9 | 58.8 | 132.2 |
| Latent heat of evaporation | kJ/kg | 2443 | 2433 | 2412 | 2370 | 2286 |
| COP-Cooling | 1 | 6.26 | 6.16 | 5.95 | 5.55 | 4.81 |
| COP-Heating | 1 | 7.26 | 7.16 | 6.95 | 6.55 | 5.81 |
| COP-Cooling (modified) | 1 | 11.26 | 7.90 | 6.67 | 5.85 | 4.92 |
| COP-Heating (modified) | 1 | 12.26 | 8.90 | 7.67 | 6.85 | 5.92 |

Figure 7A:
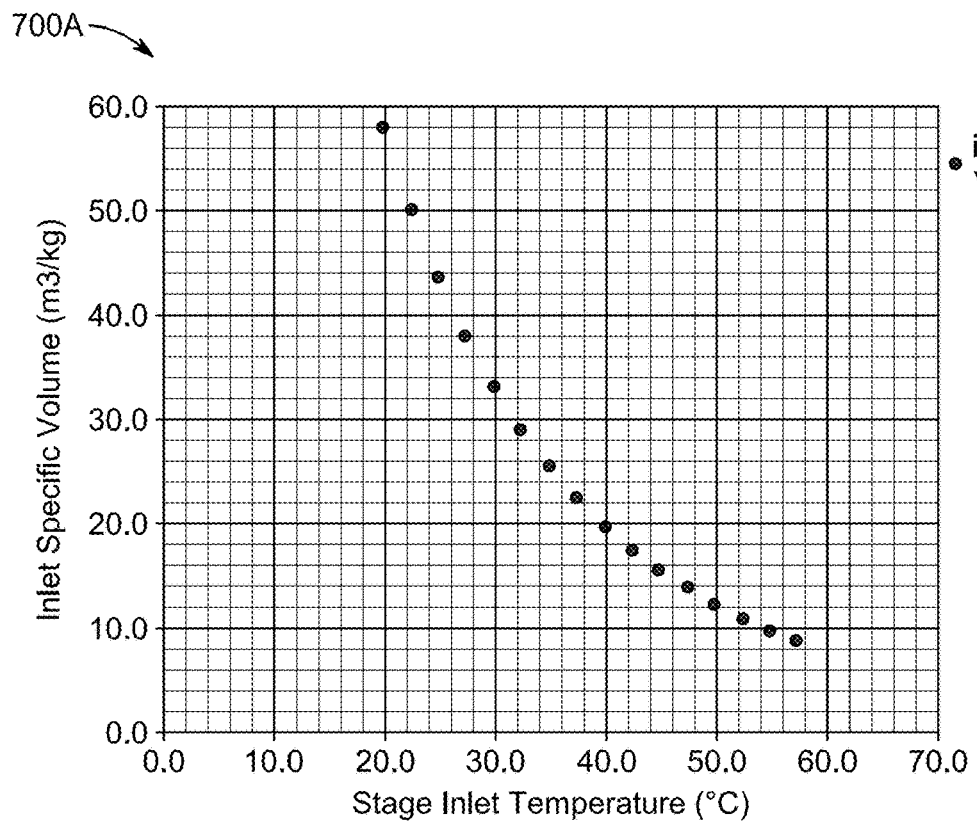
FIG. 7A is a graphical representation of inlet steam specific volume as a function of stage inlet temperature for the multiple-effect system, according to certain embodiments of the present disclosure.
Figure 7B:
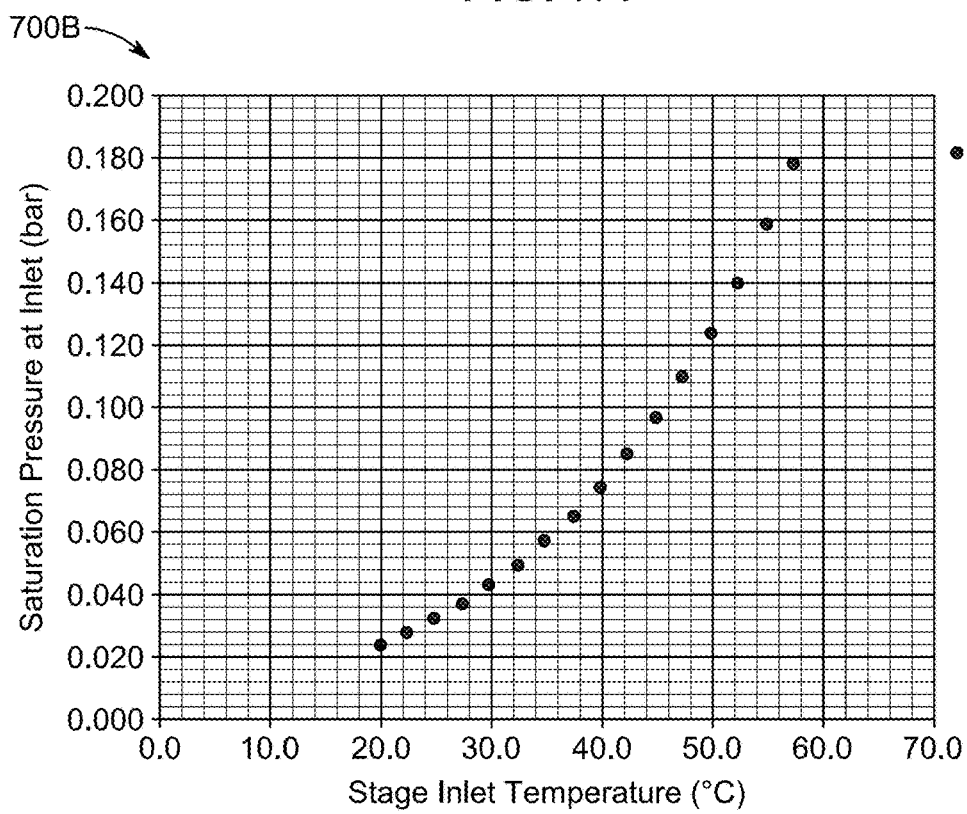
FIG. 7B is a graphical representation of saturation pressure at inlet as a function of the stage inlet temperature for the multiple-effect system, according to certain embodiments of the present disclosure.

FIG. 7A illustrates a graphical representation 700A of inlet specific volume of water vapor or steam as a function of stage inlet temperature for the compressor 502 of the system 300, according to certain embodiments. As may be seen from FIG. 7A, the inlet specific volume for compressors in the compressor stack decreases with increase in the stage inlet temperature thereof. Referring to FIG. 7B, a graphical representation 700B of saturation vapor pressure of the water at inlet as a function of the stage inlet temperature for the compressor 502 of the system 300 is illustrated, according to certain embodiments. As seen from FIG. 7B, the saturation temperature at inlet for compressors in the compressor stack increases with increase in the stage inlet temperature thereof.

Figure 8:
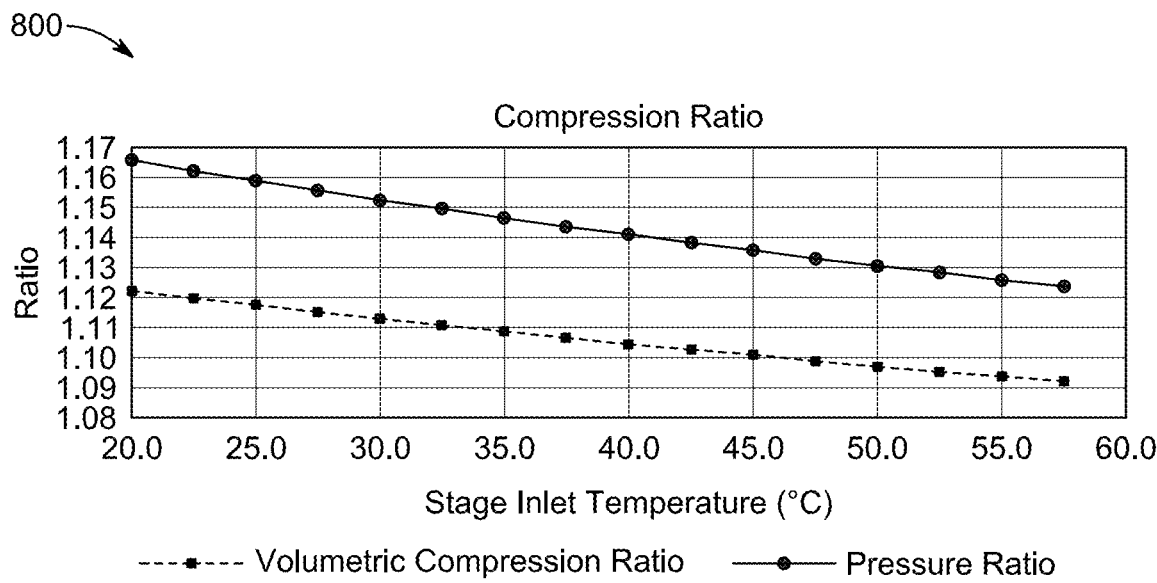
FIG. 8 is a graphical representation of a volumetric compression ratio and a pressure ratio as functions of the stage inlet temperature for the multiple-effect system, according to certain embodiments of the present disclosure assuming temperature gradient of 2.5° C.
Figure 9:
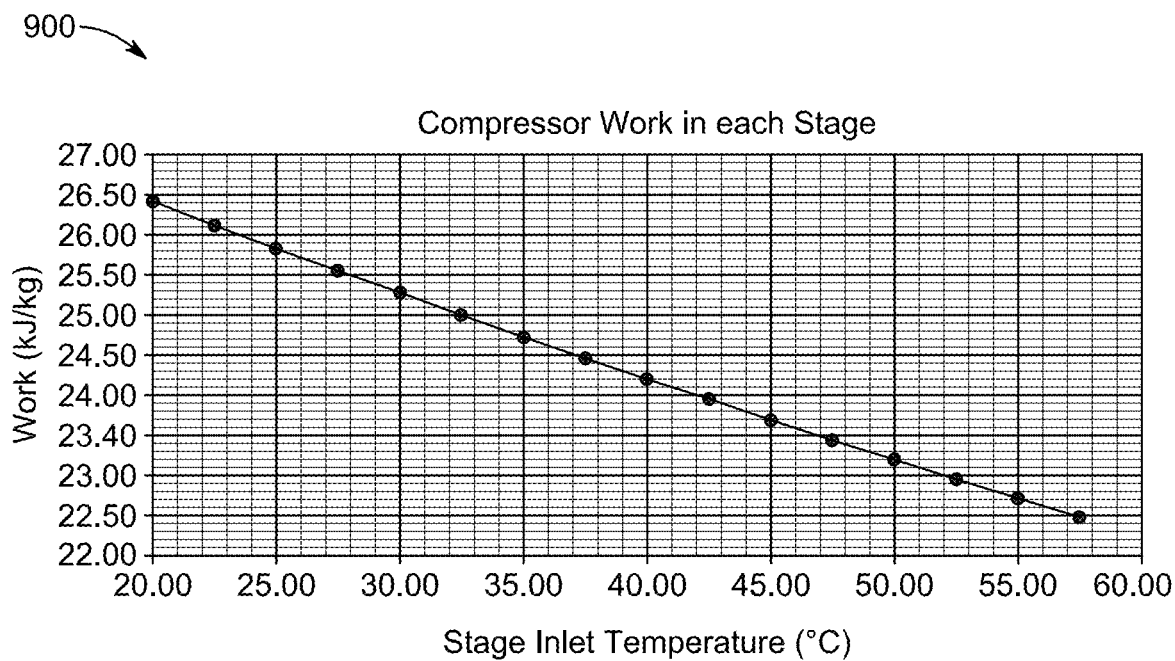
FIG. 9 is a graphical representation of energy cost per kg of water evaporated as a function of the stage inlet temperature for the multiple-effect system, according to certain embodiments of the present disclosure.

Referring to FIG. 8, a graphical representation 800 of a volumetric compression ratio and a pressure ratio as functions of the stage inlet temperature for the system 300 is illustrated assuming that there are 16 stages of 2.5° C. temperature lift per stage. As may be seen from FIG. 8, the volumetric compression ratio as well as the pressure ratio for compressors in the compressor stack (i.e., for the adjacent desalination chambers 520, 522, 524) decreases with increase in the stage inlet temperature thereof. Referring to FIG. 9, a graphical representation 900 of energy cost per kg of water evaporated as a function of the stage inlet temperature for the system 300 (assuming enthalpy difference 2.5° C. temperature gradient and 80% mechanical efficiency) is illustrated. As may be seen from FIG. 9, the compressor It may be understood from the Table 1, although the smallest step corresponds to the best water productivity, coefficient of performance, water specific cost, and the number of stages are optimization parameters to be considered for the initial cost of the system 300. It may be appreciated that, since the multi-effect system 300 is a co-generation process of cooling/heating and water purification, the water cost may not be compared to a single purpose desalination system, as the system 300 also performs heat pumping.

To this end, it may be understood that, increasing the number of stages (cascades/effects) of compression is expected to improve the coefficient of performance in any cooling/heating system. This is due to reducing the superheating of the refrigerant by introducing intercooling. Each stage of the system 300 generates an equivalent amount of desalinated water which adds to the water productivity.

Figure 10:
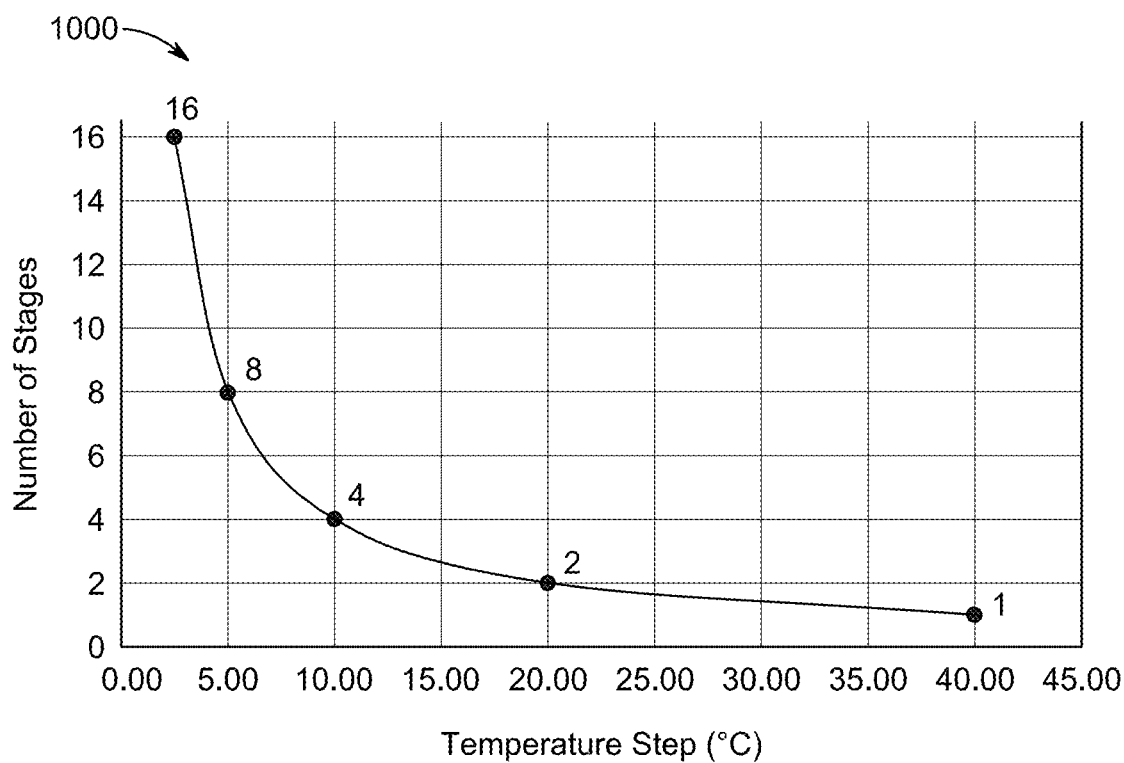
FIG. 10 is a graphical representation depicting relation between number of stages for given temperature gradient steps for the multiple-effect system, according to certain embodiments of the present disclosure.
Figure 11A:
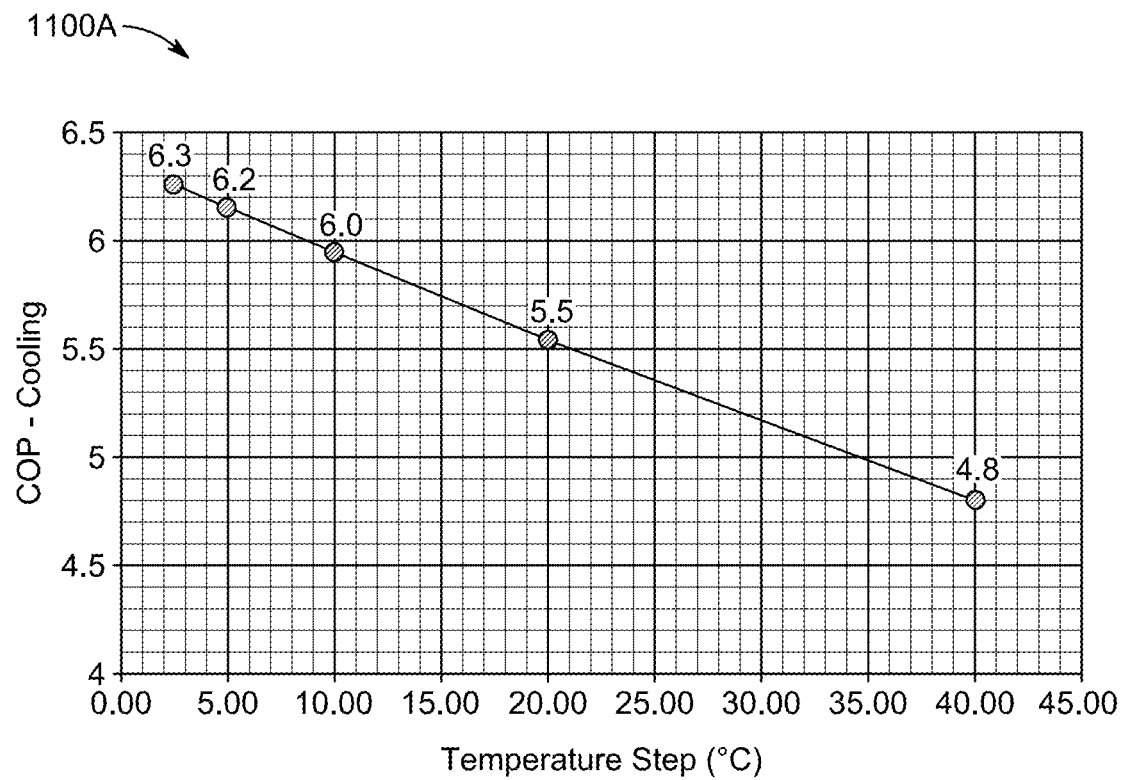
FIG. 11A is a graphical representation depicting relation between cooling coefficient of performance (COP-Cooling) for given temperature gradient steps for the multiple-effect system, according to certain embodiments of the present disclosure.
Figure 11B:
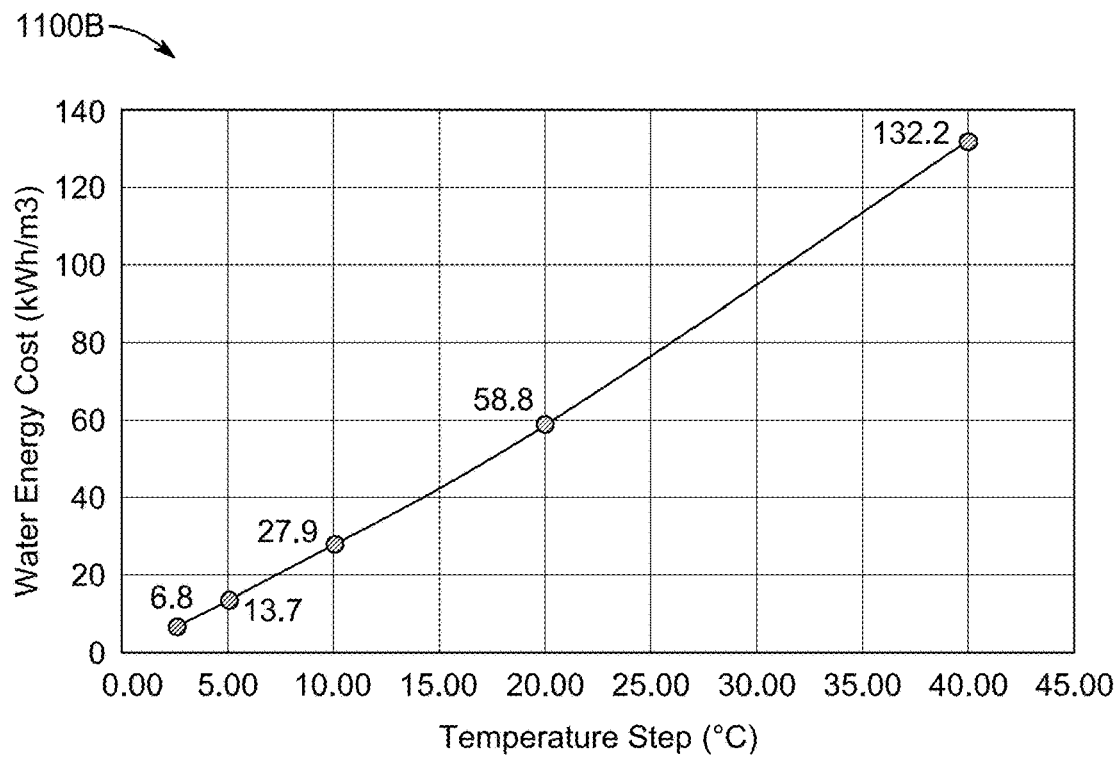
FIG. 11B is a graphical representation depicting relation between water energy cost for given temperature gradient steps for the multiple-effect system, according to certain embodiments of the present disclosure.

Referring to FIG. 10, a graphical representation 1000 depicting relation between number of stages for given temperature gradient steps for the system 300 is illustrated. As may be seen from FIG. 10, the number of stages (i.e., number of compressions required) is inversely proportional to the temperature gradient. Now referring to FIG. 11A, a graphical representation 1100A depicting relation between cooling coefficient of performance (COP-Cooling) for given temperature gradient steps for the system 300 is illustrated. As may be seen from FIG. 11A, the COP-Cooling improves with increase in the number of stages. In particular, the COP-Cooling is improved from 6.3 for a single stage to 4.8 for 16 stages (about 30% improvement). Referring to FIG. 11B, a graphical representation 1100B depicting relation between water energy cost for given temperature gradient steps for the system 300 is illustrated. The water energy cost drastically reduces with increase in the number of stages. In particular, the water energy cost falls from 132 kWh/m3 to 6.8 kWh/m3 (about 95% reduction in cost or about 20X fall in cost). For understanding, the water specific energy cost for the present multi-effect system 300 is excellent in absolute terms; as in the existing MED system 100, the cost is above 10 kWh/m3, and in reverse osmosis (RO) is around 3-4 kWh/m3. The performance of the system 300 at 16 stages of compression is on par with the existing techniques in the desalination industry.

Figure 12:
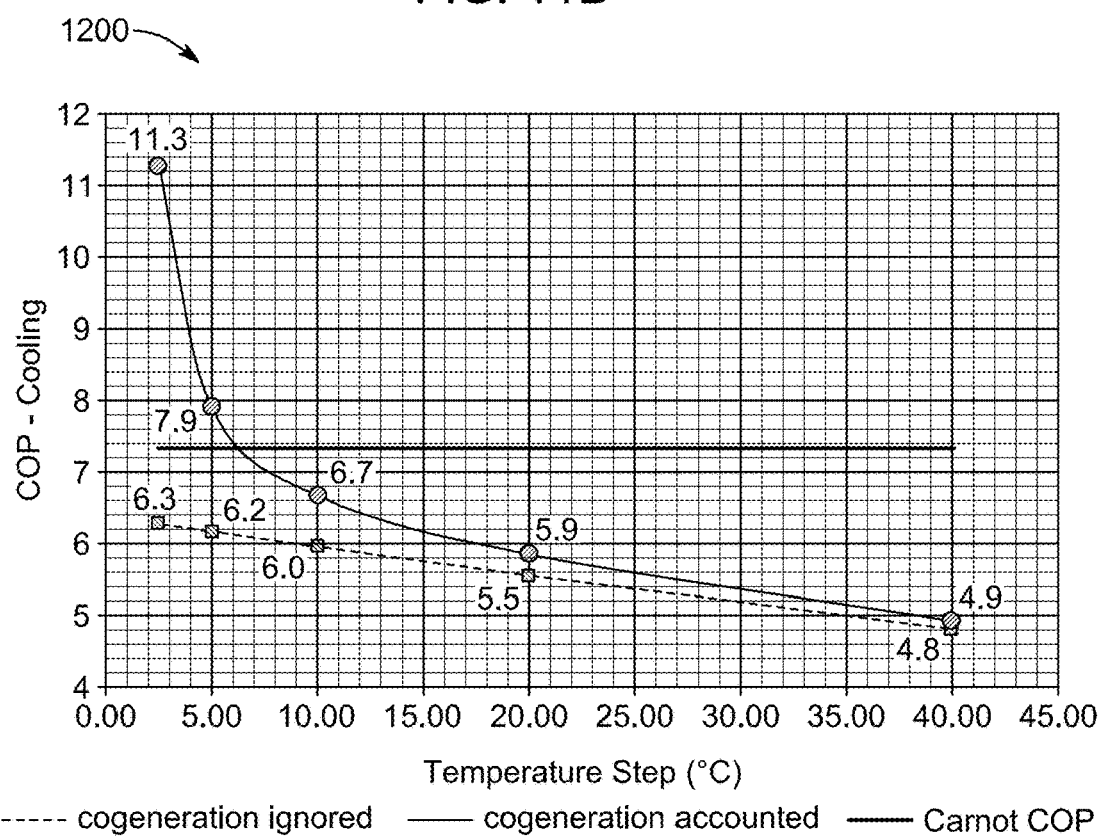
FIG. 12 is a graphical representation depicting relation between change in COP-Cooling for given temperature gradient steps with and without accounting for cogeneration for the multiple-effect system, according to certain embodiments of the present disclosure.

The above analysis assumes that cooling is a free by-product. To account for co-generation, the energy cost of desalination needs to be deducted assuming maximum performance of desalination industry, which is 3 kWh/m3 (or 10.8 kJ/kg). This deduction reduces the energy cost for the cooling process which is reflected in higher COP as shown in the last two rows in Table 1. Referring to FIG. 12, a graphical representation 1200 depicting relation between change in COP-Cooling for given temperature gradient steps with and without accounting for cogeneration for the system 300 is illustrated. The graphical representation 1200 also compares the performance in terms of the COP-Cooling with an equivalent Carnot cycle (Carnot COP). As may be seen from FIG. 12, the COP-cooling is 11.3 which is an 134% increase compared to 4.8 (i.e., more than doubling the cooling performance). The COP metrics $$\left(COP_{Carnot} = \frac{T_L}{T_H - T_L} = \frac{273.15 + 20}{40} = 7.3\right).$$

may also be compared to Carnot refrigerator's value It may be understood that the COP-Cooling of a pure cooling system never exceeds Carnot COP. However, it may be possible by the system 300 to exceed the Carnot COP considering the modifications to the system 300.

The system 300 combines cooling and desalination processes at the system level. Such cogeneration of water purification and cooling allows distributed water purification and a significant reduction in the energy cost of desalination since the water is obtained as a by-product of the cooling process. The system 300 may also be useful in cold countries where heating, rather than cooling, may be required. The energy cost of the process is similar to the energy cost of cooling/heating of HVAC methods using mechanical vapor compression. The water steam serves as a refrigerant in the compression process. The steam source comes from saline water and is condensed as fresh water which is removed as a secondary product of the process. The process is repeated over small temperature steps to multiply the water productivity with similarity to the multi-effect distillation (MED)

Figure 13:
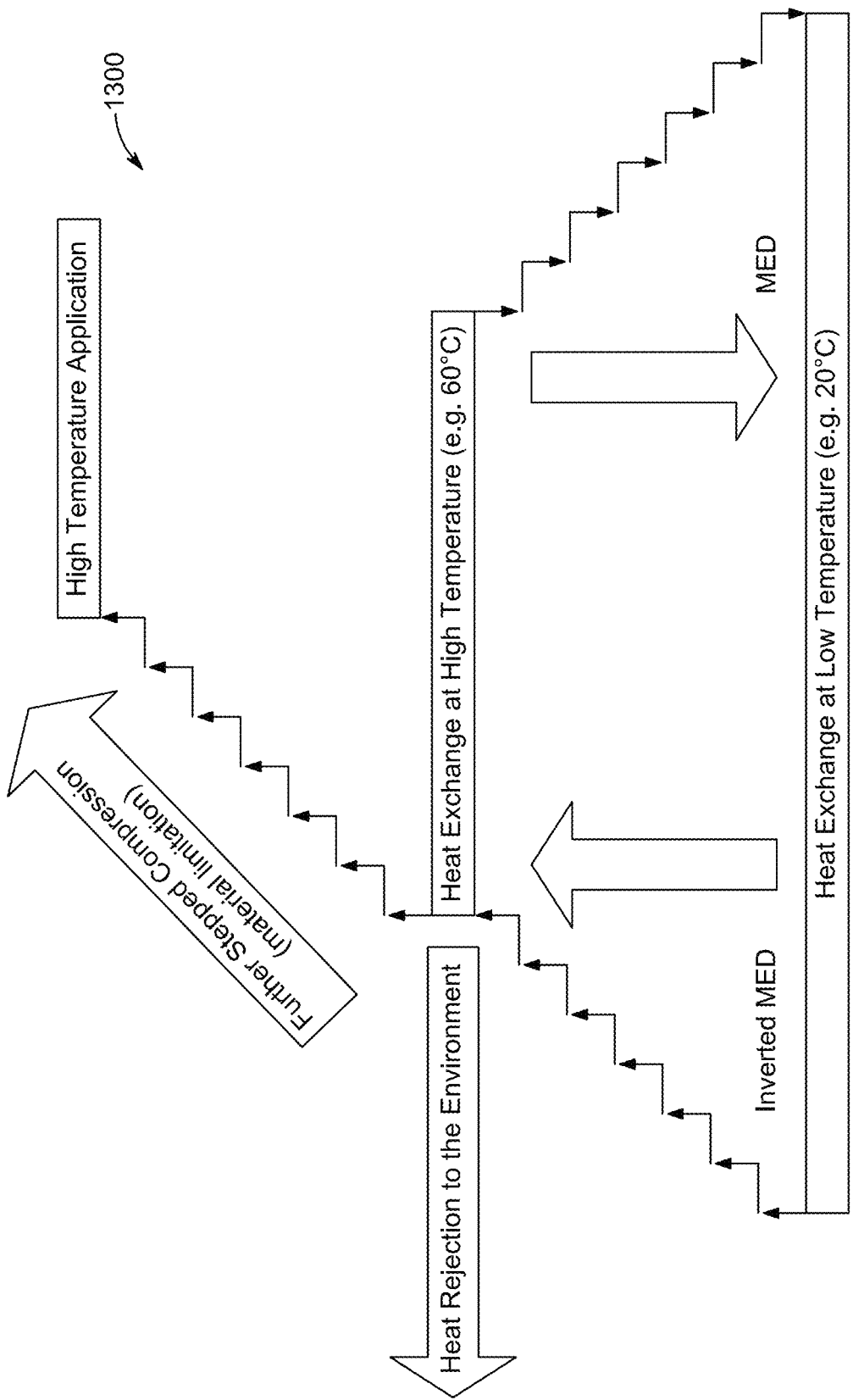
FIG. 13 is a schematic of the multiple-effect system, according to certain embodiments of the present disclosure.

Although the system 300 is described as a cooling/heating system with desalination cogeneration, other possible extensions may be apparent to those skilled in the art. FIG. 13 is a schematic of a possible integrated process 1300 using the system 300 generally combined with other technologies to illustrate possible application areas. In particular there are four application areas shown in FIG. 13 which are discussed in more detail in the following paragraphs with reference to FIGS. 14A-14D.

Figure 14A:
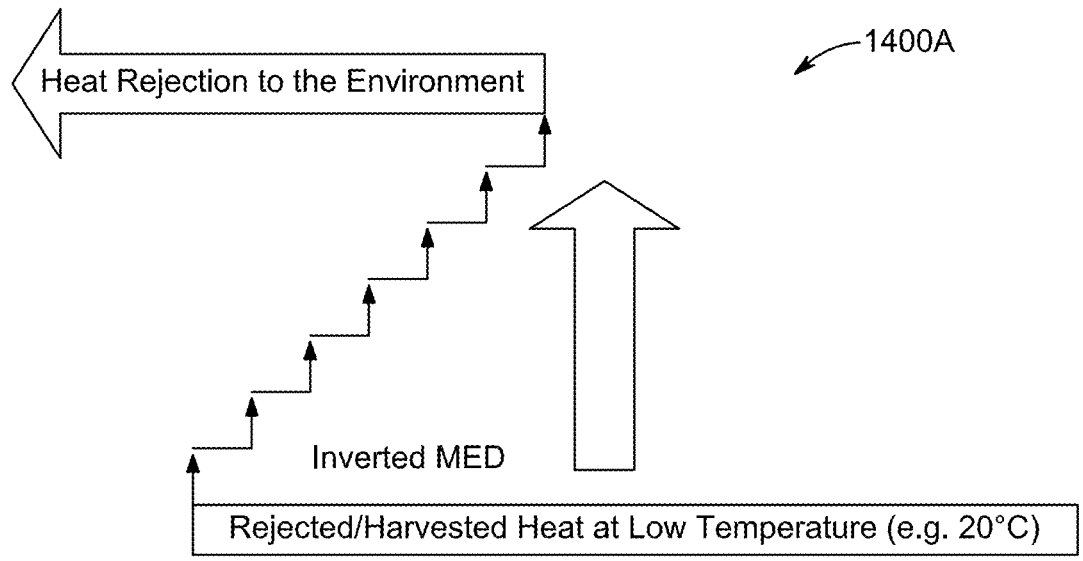
FIG. 14A is a schematic of the multiple-effect system for cooling and desalination application, according to certain embodiments of the present disclosure.

Referring to FIG. 14A, a schematic of a multiple-effect system 1400A for cooling and desalination application is illustrated. The multiple-effect system 1400A adds desalination co-generation to the cooling/heating process that uses mechanical vapor compression (MVC). A basic feature of any MVC is evaporation of refrigerant to absorb thermal energy and condensing the vapor to reject thermal energy. These two processes are the distillation process including evaporation from saline water and condensing water vapor into fresh water. It may be contemplated that the compressor may be the main energy consumer; and in the proposed multiple-effect system 1400A, the implemented process achieves the distillation while the compressor provides the environmental cooling/heating effect. Heat may also be harvested from an outdoor environment and rejected to an indoor environment at the heat source and sink, respectively, as illustrated in the multiple-effect system 1400A. In one embodiment, the heat rejection to the environment can be used as HVAC cooling with surrounding air as a heat sink. In one embodiment, the external environment may be a cold source 302 while the heat sink 304 is the indoor environment. This system may be applicable in a cold environment. The indoor environment may include air, hydronic fluid, and/or a thermal transfer fluid. In one embodiment, the temperature ranges of the cold source and the heat sink may be extended using at least one additional compressor. The extended range may allow the system to function in similar operational capacities for both cooling and heating, similarly to traditional HVAC systems.

An important aspect to consider is the amount of water produced. For instance, a typical villa house in Saudi Arabia uses around 100 kWh per day for cooling on average. If the average COP is 3, then the thermal energy absorbed from the building is 300 kWh. Now, converting this thermal energy into water and multiplying it by the stages of the inverted MED, which provides:

100 $kWh_{electrical}$=300 $kWh_{thermal}$≅0.440 $m^3$

Using this, the water generated per day from a typical cooling load of a residential building for given temperature gradient may be as provided in Table 2 below.

TABLE 2

| Temperature gradient | ° C. | 2.5 | 5 | 10 | 20 | 40 |
|---|---|---|---|---|---|---|
| Stages | # | 16 | 8 | 4 | 2 | 1 |
| Water/day | m³ | 7.04 | 3.52 | 1.76 | 0.88 | 0.44 |

If a family includes 5 members, use of water may be estimated to be about 250 liters/person per day. Then, 1.25 m3/day is the required water, which is a reasonable estimate. From the above Table 2, it may be understood that the proposed multiple-effect system 1400A may be able to generate all the potable water with spare capacity using only 4 stages; and 8 stages generate more than double the daily needs suggesting a positive environmental impact to the city.

Figure 14B:
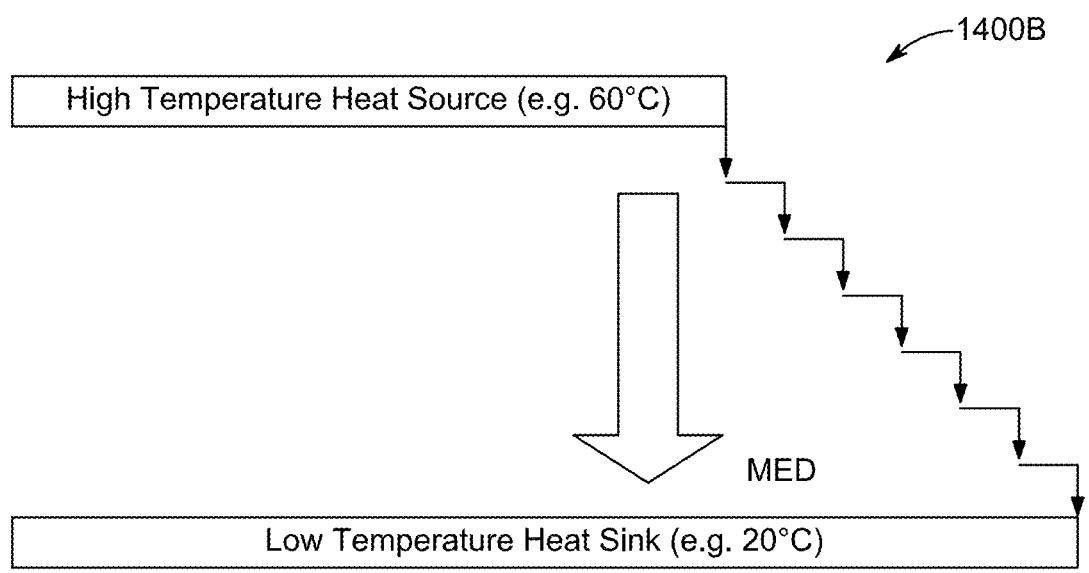
FIG. 14B is a schematic of a MED system using a stack of distillation chambers for thermally driven desalination only application, according to certain embodiments of the present disclosure.

Referring to FIG. 14B, a schematic of a MED system 1400B using a stack of distillation chambers for thermally driven desalination only application is illustrated. As discussed, the MED process is driven by an elevated temperature thermal energy source like waste heat from power generation or other industrial processes. To avoid material corrosion, the elevated temperature is typically limited to about 70° C. The lower limit is set by ambient temperature or the available rejection medium. The complexity of the conventional MED system 1400B sets a lower limit on its size to be economical of 3000 m³/day. The implementation of the proposed flat chamber design may render the MED system 1400B scalable to small sizes (since the area would be increased). The use of external enclosure (such as, the external enclosure 510) also permits use of less materials because of low pressure requirement, further reducing the cost for the MED system 1400B.

Figure 14C:
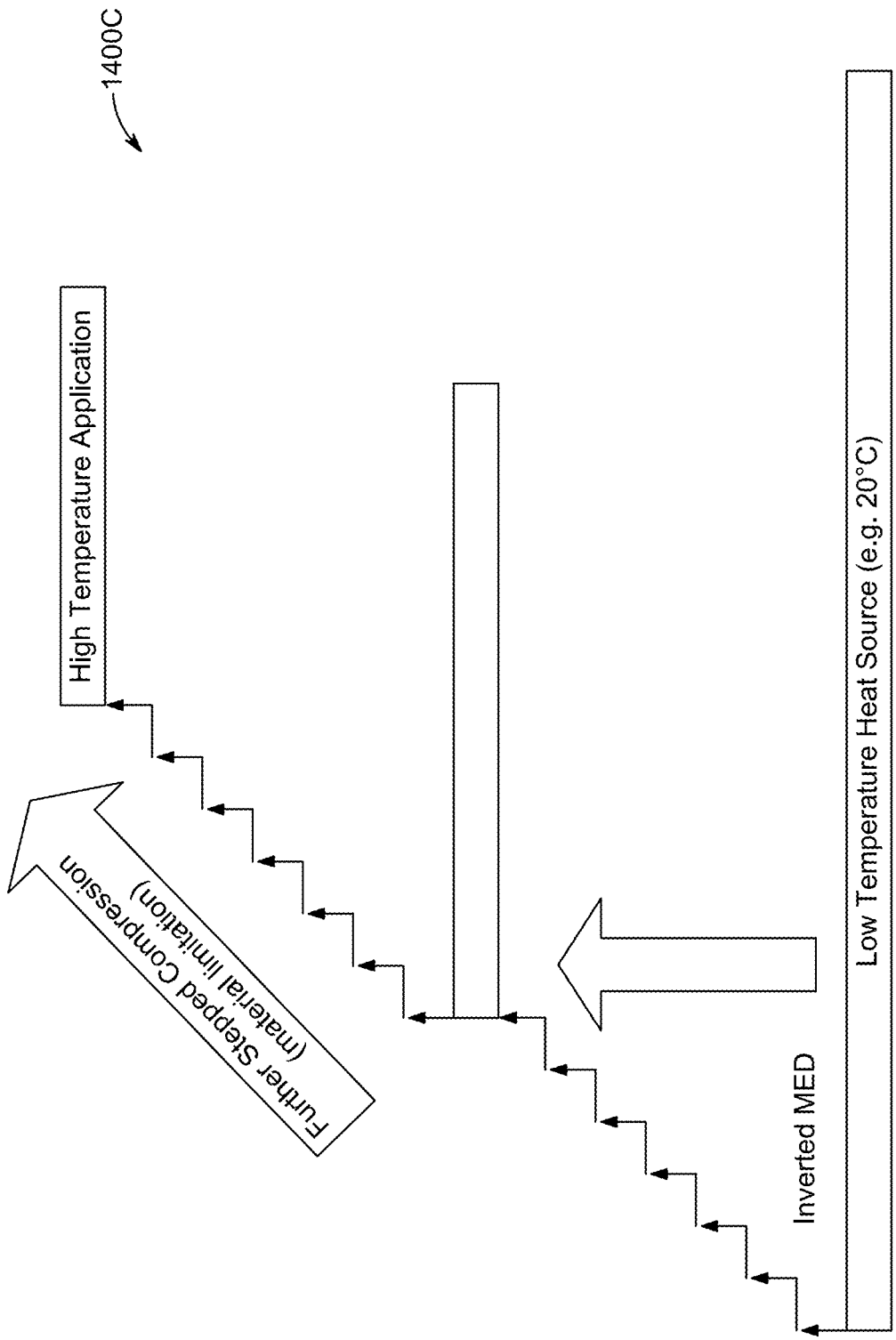
FIG. 14C is a schematic of a modified multiple-effect system for driving higher temperature application, according to certain embodiments of the present disclosure.

Referring to FIG. 14C, a schematic of a modified multiple-effect system 1400C for driving higher temperature application is illustrated. It may be appreciated that corrosion of metallic pipes sets a practical temperature limit on MED The proposed flat chamber design may be coated with anti-corrosion layer; however, coating rounded pipes is much more challenging in MED. A thin plastic/polymer layer may be used as a coating, but such layers may reduce thermal conductivity. To address such reduction in thermal conductivity, a larger temperature gradient may be selected to maintain thermal performance, as shown for the modified multiple-effect system 1400C. For this purpose, in the modified multiple-effect system 1400C, the plastic material may also be switched to plastics compatible with higher temperatures. The external enclosure (such as, the external enclosure 510) may be provided with multiple compartments to reap the benefits of reduced material requirements in the elevated temperature range. It may be understood that the upper theoretical high temperature limit is the critical point of water, which is about +374° C. The temperature limit in practice is set by the nature of the application (for example, like food processing). It is also possible to use the modified multiple-effect system 1400C to augment other heating processes. For example, the modified multiple-effect system 1400C may be used to provide thermal energy for up to 200° C., and then use natural gas or hydrogen to increase the temperature to a higher level. In general, the modified multiple-effect system 1400C may be operated as a high temperature source around 100-300° C. with proper design including suitable corrosion resistance coating on the metal plate holding the saline water layer, structural materials that may tolerate larger pressure values, and using multiple external enclosures with each enclosure designed to operate at a design pressure range.

Figure 14D:
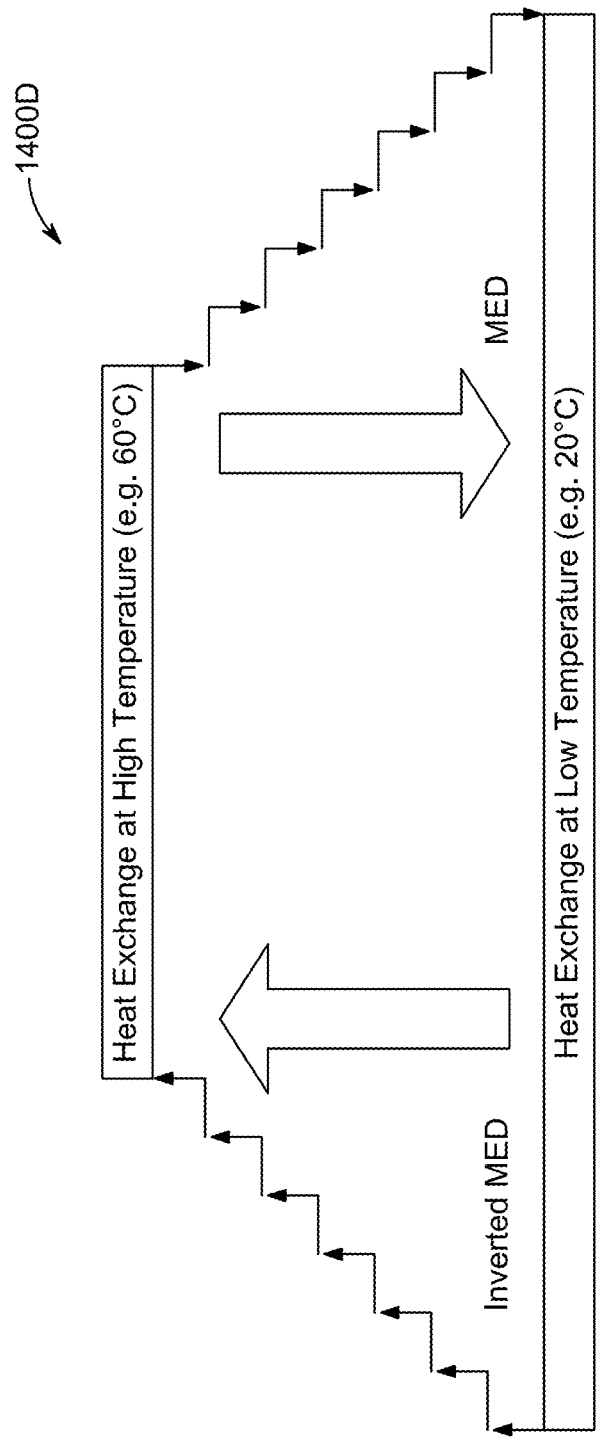
FIG. 14D is a schematic of a combined system including the multiple-effect system of FIG. 14A and the MED system of FIG. 14B for electrically driven desalination application, according to certain embodiments of the present disclosure.

Referring to FIG. 14D, a simplified schematic of a combined system 1400D including the present multiple-effect system 1400A of FIG. 14A and the MED system 1400B of FIG. 14B for electrically driven desalination application is illustrated. Such combined system 1400D may be implemented as a pure desalination system. The mechanical vapor compression (MVC) can be combined with the MED for an electrically driven system. The MVC creates the thermal gradient, and the MED uses the thermal gradient. The proposed combined system 1400D using the inverted MED of the multiple-effect system 1400A (or multi effect compression (MEC)) can be used to drive the MED system 1400B therein. Thus, the proposed combined system 1400D may be able to operate continuously to generate fresh water using only electrical input energy.

As may be contemplated, the MEC is water productive compared to the MVC. If IVIED and MEC use the same number of stages, then the combined system 1400D may almost double the water output of the standalone MED system (such as, the MED system 1400B) at the same energy cost. It may be noted that the energy cost of the water produced from sixteen stages of 2.5° C. temperature gradient (6.26 kWh/m3) is halved in the combined system 1400D to become 3.23 kWh/m3 which makes it on par with Reverse Osmosis energy cost of 3-4 kWh/m3. It may further be noted that the evaporative methods as used by the combined system 1400D are less prone to biological damage (like algae blooms) compared to membrane methods as used by the Reverse Osmosis, providing a further advantage to the combined system 1400D of the present disclosure.

Figure 15:
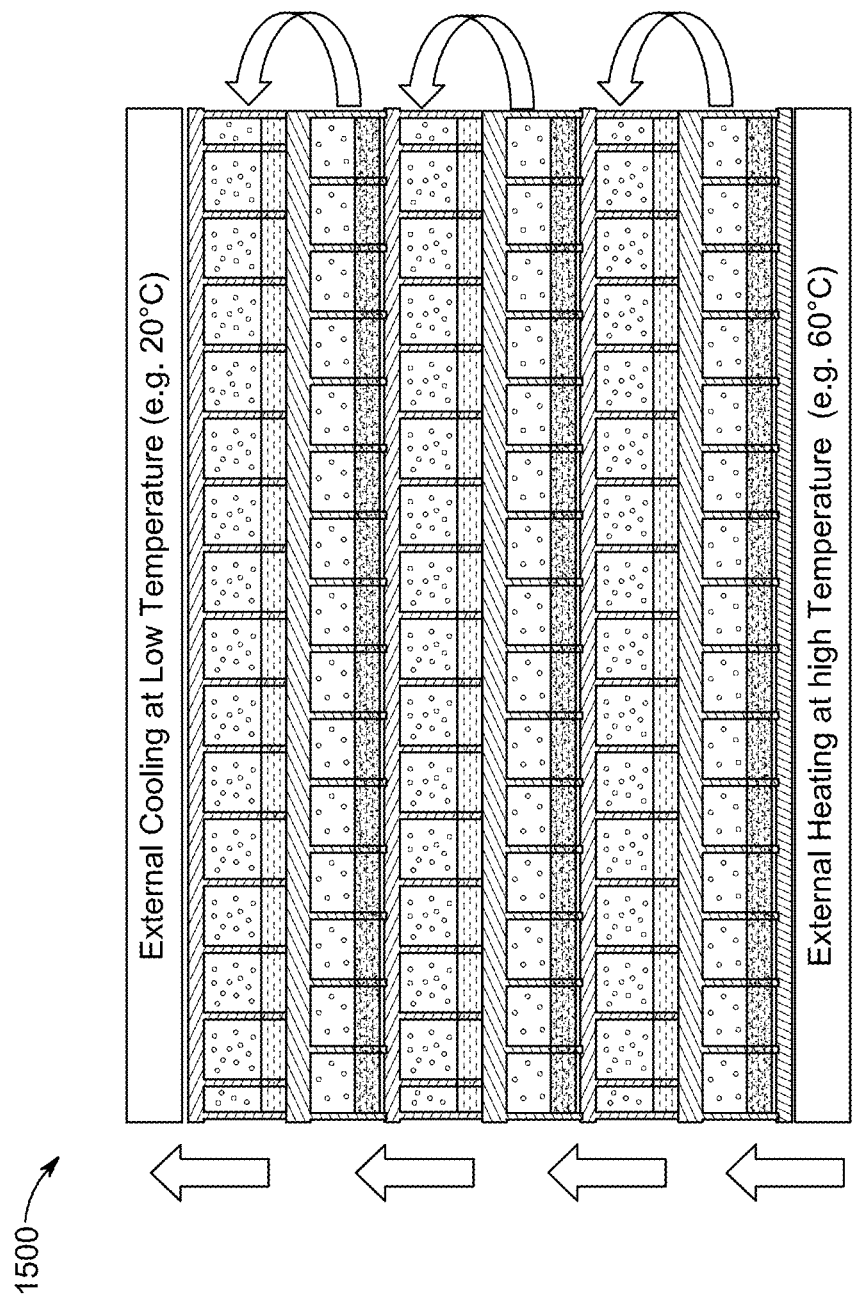
FIG. 15 is an exemplary cross-sectional view of a stack of distillation chambers for the MED system, according to certain embodiments of the present disclosure.

In an embodiment, for the combined system 1400D, the constituent MED system 1400B may include a stack of distillation chambers, which may be formed by modification of the vertical stack of desalination chambers 500 (described in reference to FIGS. 5A-5C) to operate as per requirements of the MED system 1400B. FIG. 15 illustrates an exemplary cross-sectional view of a stack of distillation chambers 1500 for the MED system 1400B. Referring to FIG. 15 in combination with FIG. 1, in the MED system 1400B (which is equivalent to the MED system 100 of FIG. 1), the saline water from the saline water feed 113 is sprayed onto the steam pipe 109. The saline water is heated by the steam pipe 109 and evaporates. Steam in the steam pipe 109 condenses when the saline water is sprayed onto the steam pipe 109, resulting in fresh water. The evaporated saline water is collected and pumped into the steam pipe 109 of a next distillation chamber in the stack of distillation chambers 1500, for further processing. In the present example, each distillation chamber has a lower temperature and a lower pressure than an immediately preceding distillation chamber, in the stack of distillation chambers 1500.

Figure 16:
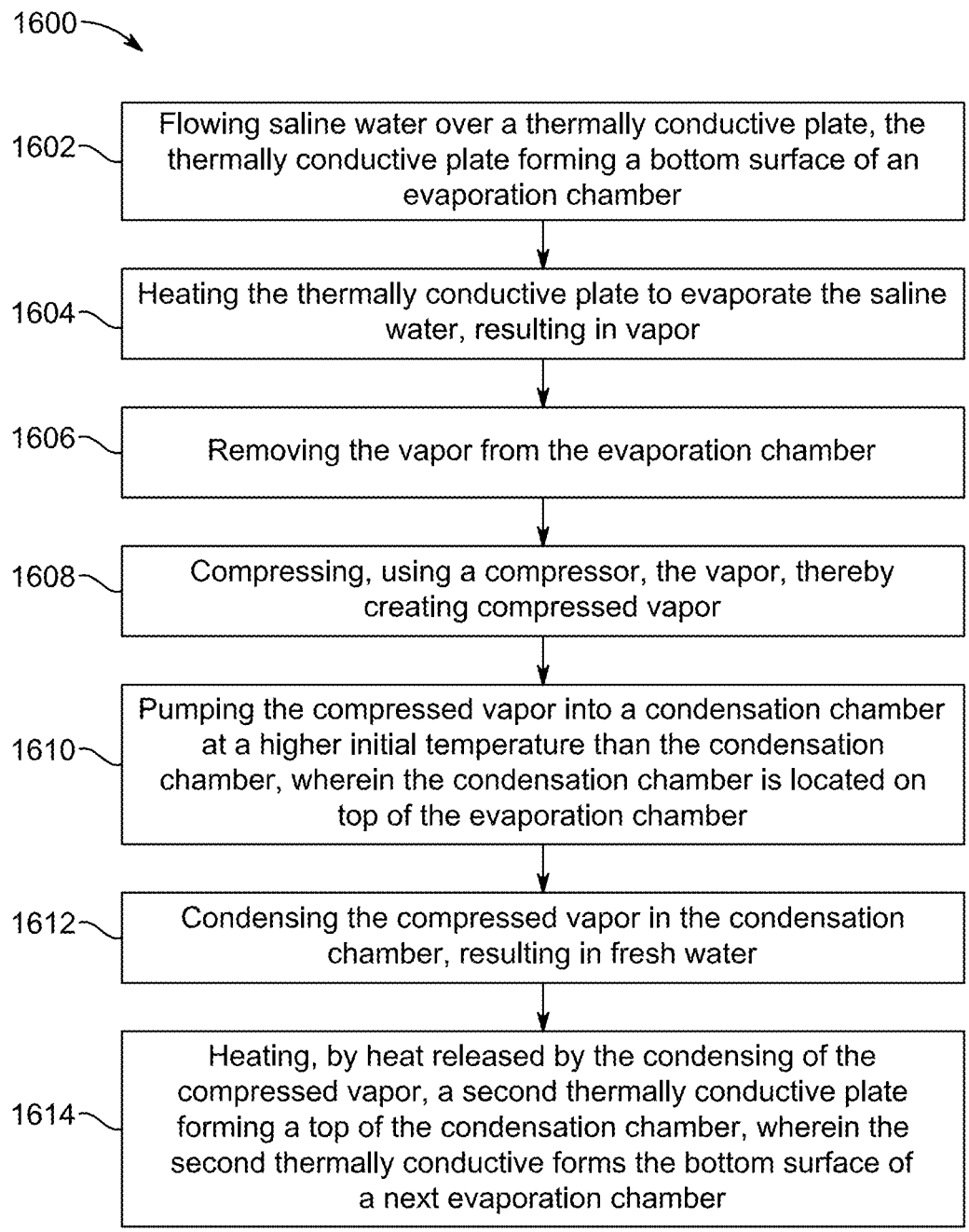
FIG. 16 is a flowchart of a multiple-effect method for desalination, according to certain embodiments of the present disclosure.

Referring to FIG. 16, a flowchart of a method 1600 for desalination is illustrated. It may be understood that the steps described in reference to the method 1600 are only illustrative, and other alternatives may also be provided where one or more steps are rearranged, one or more steps are added, or one or more steps are removed without departing from the spirit and the scope of the present disclosure.

At step 1602, the method 1600 includes flowing the saline water over the thermally conductive plate (such as, the first thermally conductive plate 534), in which the thermally conductive plate 534 forms the bottom surface of the first evaporation chamber 530 in the first desalination chamber 520. Further, the first desalination chamber 520 is part of the vertical stack of desalination chambers 500. Each desalination chamber 520, 522, 524, in the vertical stack of desalination chambers 500 includes the condensation chamber 532, 542, 552, respectively, located on top of the respective evaporation chamber 530, 540, 550.

At step 1604, the method 1600 includes heating the thermally conductive plate (like, the first thermally conductive plate 534) to evaporate the saline water, resulting in vapor. That is, in the first evaporation chamber 530, the first thermally conductive plate 534 is heated to cause evaporation of the saline water, resulting in vapor. In an example, the method 1600 includes heating the first evaporation chamber 530 to 20° C. That is, the first evaporation chamber 530, or specifically the first thermally conductive plate 534, is heated to about 20° C. (typical temperature of the cold source 302). In an example, the method 1600 includes removing heat from an external environment surrounding the first evaporation chamber 530 to evaporate the saline water.

At step 1606, the method 1600 includes removing the vapor from the first evaporation chamber 530. The vapor from the first evaporation chamber 530 is removed into the compressor 502, because of the suction pressure created in the first evaporation chamber 530 by the compressor 502. The vapor from the first evaporation chamber 530 is passed into the compressor 502 via the corresponding inlet 502a of the compressor 502 associated with the first evaporation chamber 530 in the vertical stack of desalination chambers 500.

At step 1608, the method 1600 includes compressing, using the compressor 502, the vapor, thereby creating compressed vapor. That is, the vapor is compressed by the compressor 502, thereby creating compressed vapor. The compression processes may be performed with a sectioned single compressor having a single driving motor but with multiple inputs and outputs of steam flows. In an example, the compressor 502 is part of a compressor stack. In an example, the compressor stack is driven by a single mechanical or electrical drive. In general, the multi-effects compression needs as many compressors with small compression factors as the number of effects. However, the same effect may be obtained by adapting the compressor 502 to accept multiple inputs/outputs and be operated by a single mechanical/electrical drive.

In an example, the method 1600 further includes matching a heat transfer rate in each compressor of the compressor stack. This is due to the fact that the specific volume of the steam changes with temperature, thus the volumetric flow rate for the compressors in the compressor stack may need to be proportional to the designed temperature for each stage. In the present embodiment, as described in reference to FIGS. 6A-6D, this is achieved by: (i) varying the inlet intake volume of each compressor; (ii) varying the speed of the compressors; and/or (iii) varying the duty factor of the compressors, in the compressor stack.

At step 1610, the method 1600 includes pumping the compressed vapor into the first condensation chamber 532 in the first desalination chamber 520, in which the compressed vapor is at a higher initial temperature than a temperature of the first condensation chamber 532. That is, the compressed vapor is pumped from the compressor 502 into the first condensation chamber 532. The compressed vapor is at a higher initial temperature than a temperature of the first condensation chamber 532, due to the compression effect provided by the compressor 502.

At step 1612, the method 1600 includes condensing the compressed vapor in the first condensation chamber 532, resulting in fresh water. Now, due to the said temperature difference between the initial temperature of the compressed vapor and the temperature of the first condensation chamber 532, the compressed vapor condenses in the first condensation chamber 532, resulting in fresh water. Such condensation process results in release of heat in the first condensation chamber 532. In an example, the method 1600 includes adding heat to an external environment surrounding the first condensation chamber 532 by condensing the vapor.

At step 1614, the method 1600 includes heating, by heat released by the condensing of the compressed vapor, the second thermally conductive plate 544 forming the top of the first condensation chamber 532, and in which the second thermally conductive plate 544 forms the bottom surface of a next evaporation chamber in a next desalination chamber in the vertical stack of desalination chambers 500. Since the second thermally conductive plate 544 forms the top of the first condensation chamber 532, the heat released due to the condensation process in the first condensation chamber 532 may heat the second thermally conductive plate 544. Further, the second thermally conductive plate 544 forms the bottom surface of a next evaporation chamber, i.e., the second evaporation chamber 540. In the second evaporation chamber 540, the heat provided to the second thermally conductive plate 544 cause evaporation of the saline water, resulting in vapor. Then, the vapor is compressed by the compressor 502, thereby creating compressed vapor. The compressed vapor is pumped from the compressor 502 into the second condensation chamber 542. The compressed vapor is at a higher initial temperature than a temperature of the second condensation chamber 542. Due to the temperature difference, the compressed vapor condenses in the second condensation chamber 542, resulting in fresh water. Such condensation process results in release of heat in the second condensation chamber 542. This process is repeated for all stages in the vertical stack of desalination chambers 500. In an example, the method 1600 further includes cooling a last condensation chamber in the vertical stack of desalination chambers 500 to 60° C.

In an example, the method 1600 further includes maintaining an external pressure surrounding the vertical stack of desalination chambers 500 in which the external pressure is less than atmospheric pressure. In an example, the method 1600 further includes removing non-condensable gases from the first condensation chamber 532. For this purpose, the external enclosure 510 is employed surrounding the vertical stack of desalination chambers 500 and the components associated thereto. Further, the fourth set of valves 512 is provided, which is coupled to the vertical stack of desalination chambers 500 and leading to a vacuum pump (not shown) for maintaining the external pressure surrounding the vertical stack of desalination chambers 500 to be less than the atmospheric pressure. This, in turn, promote evaporation of the saline water in the evaporation chambers 530, 540, 550 and the condensation of vapors in the condensation chambers 532, 542, 552. In one embodiment, an absence of additional non-condensable gases in the evaporation and condensation chambers may improve evaporation and condensation of saline and fresh water, respectively. In one embodiment, there may be at least one vacuum in the external enclosure. The external enclosure 510 also reduces the structural requirements on the material by placing the vertical stack of desalination chambers 500 in low pressure environment rather than the atmospheric pressure.

In the present system and method, the water steam serves as a refrigerant in the compression process. The steam is generated from saline water by evaporation, which is then condensed as fresh water and is removed as a secondary product of the process. The process is repeated over small temperature steps to multiply the water productivity with some similarity to the multi-effect distillation (MED) This cogeneration of water purification and cooling permits distributed water purification, and a significant reduction in the energy cost of desalination since the water comes as a by-product of the cooling process. The teachings of the present disclosure may also be implemented in cold regions where heating rather than cooling may be required. The energy cost of the process is similar to the energy cost of cooling/heating of HVAC methods using mechanical vapor compression.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A multiple-effect method for desalination, comprising:
    flowing saline water over a thermally conductive plate, the thermally conductive plate forming a bottom surface of a first evaporation chamber in a first desalination chamber,
    the first desalination chamber being part of a vertical stack of desalination chambers, each desalination chamber in the vertical stack of desalination chambers comprising a condensation chamber located on top of an evaporation chamber;
    heating the thermally conductive plate to evaporate the saline water, resulting in vapor;

removing the vapor from the first evaporation chamber;
compressing, using a compressor, the vapor, thereby creating compressed vapor;
pumping the compressed vapor into a first condensation chamber in the first desalination chamber, wherein the compressed vapor is at a higher initial temperature than a temperature of the first condensation chamber;
condensing the compressed vapor in the first condensation chamber, resulting in fresh water; and
heating, by heat released by the condensing of the compressed vapor, a second thermally conductive plate forming a top of the first condensation chamber, wherein the second thermally conductive plate forms a bottom surface of a next evaporation chamber in a next desalination chamber in the vertical stack of desalination chambers.

2. The method of claim 1, further comprising heating the first evaporation chamber to 20° C.

3. The method of claim 1, further comprising cooling a last condensation chamber in the vertical stack of desalination chambers to 60° C.

4. The method of claim 1, wherein the compressor is part of a compressor stack.

5. The method of claim 4, wherein the compressor stack comprises a sequence of compressors declining sequentially in power from a bottom of the compressor stack to a bottom surface of a next evaporation chamber, and wherein each compressor of the compressor stack is driven by a common mechanical or electrical drive.

6. The method of claim 5, further comprising matching a heat transfer rate in each compressor of the compressor stack.

7. The method of claim 1, further comprising removing non-condensable gases from the first condensation chamber.

8. The method of claim 1, further comprising removing heat from an external environment surrounding the first evaporation chamber to evaporate the saline water.

9. The method of claim 1, further comprising adding heat to an external environment surrounding the first condensation chamber by condensing the vapor.

10. A multiple-effect system for desalination, comprising:
a vertical stack of desalination chambers, each desalination chamber in the vertical stack of desalination chambers comprising:
an evaporation chamber, wherein a thermally conductive plate forms a bottom surface of the evaporation chamber;
a condensation chamber on top of the evaporation chamber; and
a compressor;
wherein saline water flows over the thermally conductive plate in the evaporation chamber;
wherein the thermally conductive plate is heated to cause evaporation of the saline water, resulting in vapor;
wherein the vapor is compressed by the compressor, thereby creating compressed vapor;
wherein the compressed vapor is pumped into the condensation chamber at a higher initial temperature than the condensation chamber;
wherein the compressed vapor condenses in the condensation chamber, resulting in fresh water; and
wherein heat released during condensation of the compressed vapor heats a second thermally conductive plate forming a top of the condensation chamber;
wherein the second thermally conductive plate forms a bottom surface of a next evaporation chamber.

11. The system of claim 10, wherein the saline water is evenly distributed over the thermally conductive plate by a plurality of inlets and wherein the plurality of inlets is evenly spaced across at least one surface of the evaporation chamber.

12. The system of claim 10, wherein the compressor includes a plurality of inlets and a plurality of outlets.

13. The system of claim 10, wherein the compressor is part of a stack of compressors used to compress the vapor in the vertical stack of desalination chambers.

14. The system of claim 13, wherein the stack of compressors comprises a sequence of compressors declining sequentially in power from a bottom of the compressor stack to a top of the compressor stack, and wherein each compressor of the compressor stack is driven by a common mechanical or electrical drive.

15. The system of claim 10, wherein the condensation chamber includes a plurality of condensation surfaces.

16. The system of claim 10, wherein a temperature difference between each of the desalination chambers is approximately 2.5° C.

17. The system of claim 10, wherein the evaporation chamber and the condensation chamber are supported by pillars, and wherein the pillars are thermal insulators.

18. The system of claim 10, wherein an external pressure surrounding the vertical stack of desalination chambers is less than atmospheric pressure.

* * * * *